United States Patent
Matsubara et al.

(10) Patent No.: US 9,757,893 B1
(45) Date of Patent: Sep. 12, 2017

(54) METHOD OF MANUFACTURING A RESIN-LAMINATED BOARD

(71) Applicant: KYORAKU CO., LTD., Kyoto (JP)

(72) Inventors: Yoshitaka Matsubara, Kanagawa (JP); Tadatoshi Tanji, Kanagawa (JP)

(73) Assignee: KYORAKU CO., LTD, Kyoto-Shi, Kyoto (JP)

( * ) Notice: Subject to any disclaimer, the term of this patent is extended or adjusted under 35 U.S.C. 154(b) by 0 days.

(21) Appl. No.: 15/646,831

(22) Filed: Jul. 11, 2017

Related U.S. Application Data

(62) Division of application No. 14/129,904, filed as application No. PCT/JP2012/066679 on Jun. 29, 2012, now Pat. No. 9,738,052.

(30) Foreign Application Priority Data

Jun. 29, 2011 (JP) .................................. 2011-144965
Jun. 29, 2011 (JP) .................................. 2011-144967

(51) Int. Cl.
*B29C 33/00* (2006.01)
*B29C 51/26* (2006.01)
(Continued)

(52) U.S. Cl.
CPC .......... *B29C 51/267* (2013.01); *B29C 33/306* (2013.01); *B29C 49/48* (2013.01);
(Continued)

(58) Field of Classification Search
CPC ..... B29C 51/006; B29C 51/267; B29C 51/20; B29C 51/36; B29C 51/365; B29C 51/40
See application file for complete search history.

(56) References Cited

U.S. PATENT DOCUMENTS 1,404,320 A * 1/1922 Roberts ................. B29C 51/267
  156/145
1,540,872 A * 6/1925 Bates .................... B29C 51/267
  264/101

(Continued)

FOREIGN PATENT DOCUMENTS

JP    S62-187726    11/1987
JP    S63-025019    2/1988
(Continued)

OTHER PUBLICATIONS

International Search Report, dated Sep. 25, 2012, which issued during the prosecution of International Patent Application No. PCT/JP2012/066679.

*Primary Examiner* — Timothy Kennedy
(74) *Attorney, Agent, or Firm* — Troutman Sanders LLP

(57) ABSTRACT

A method of manufacturing a resin-laminated board by preparing a pair of first and second split molds each of which is provided with a cavity; positioning two sheet materials made of a thermoplastic resin between the first and second split molds with the cavities of the first and second split molds opposed to each other; forming a plurality of recesses by recessing a first sheet material toward a second sheet material with use of a plurality of protrusions provided to the first split mold; and welding bottoms of the recesses to the second sheet material by clamping the pair of first and second split molds to obtain a resin-laminated board with a hollow structure. A mold includes a plurality of piece members, disposed at the cavity of the first split mold; and includes the protrusions and male screws provided to base ends of the protrusions.

1 Claim, 27 Drawing Sheets

(51) Int. Cl.
*B62D 43/00* (2006.01)
*B32B 27/00* (2006.01)
*B60R 13/01* (2006.01)
*B62D 43/10* (2006.01)
*B32B 3/30* (2006.01)
*B32B 3/28* (2006.01)
*B29C 33/30* (2006.01)
*B29C 49/62* (2006.01)
*B29C 49/48* (2006.01)
*B29C 49/20* (2006.01)
*B29C 49/02* (2006.01)
*B29C 49/04* (2006.01)
*B29L 31/30* (2006.01)
*B29L 24/00* (2006.01)
*B29L 7/00* (2006.01)

(52) U.S. Cl.
CPC .......... *B32B 3/28* (2013.01); *B32B 3/30* (2013.01); *B32B 27/00* (2013.01); *B60R 13/013* (2013.01); *B62D 43/005* (2013.01); *B62D 43/10* (2013.01); *B29C 49/04* (2013.01); *B29C 2049/021* (2013.01); *B29C 2049/2017* (2013.01); *B29C 2049/4812* (2013.01); *B29C 2049/627* (2013.01); *B29L 2007/002* (2013.01); *B29L 2024/006* (2013.01); *B29L 2031/3017* (2013.01); *Y10T 428/24612* (2015.01)

(56) References Cited

U.S. PATENT DOCUMENTS

| | | | | |
|---|---|---|---|---|
| 1,625,399 A * | 4/1927 | Schaefer | | B29C 51/267 156/251 |
| 3,431,601 A * | 3/1969 | Lipscomb | | B29C 33/306 249/117 |
| 3,444,034 A * | 5/1969 | Hewett | | B29C 51/267 156/156 |
| 3,496,607 A * | 2/1970 | Larson | | B29C 33/306 249/102 |
| 3,740,178 A * | 6/1973 | Neil | | B29C 33/306 249/177 |
| 4,423,000 A * | 12/1983 | Teraoka | | B29C 51/267 264/521 |
| 5,124,191 A | 6/1992 | Seksaria | | |
| 5,470,641 A * | 11/1995 | Shuert | | B29C 51/267 108/57.27 |
| 2004/0251712 A1 | 12/2004 | Obara | | |
| 2005/0052010 A1 | 3/2005 | Best et al. | | |
| 2007/0203300 A1 | 8/2007 | Sumi et al. | | |
| 2008/0150268 A1 | 6/2008 | Best et al. | | |
| 2008/0254261 A1 | 10/2008 | Tamada | | |
| 2009/0075041 A1 | 3/2009 | Schweiggart et al. | | |
| 2010/0084888 A1 | 4/2010 | Ishitobi et al. | | |
| 2011/0135862 A1 | 6/2011 | Sumi et al. | | |
| 2011/0250384 A1 | 10/2011 | Sumi et al. | | |
| 2011/0303355 A1* | 12/2011 | Sumi | | B29C 51/267 156/245 |

FOREIGN PATENT DOCUMENTS

| | | |
|---|---|---|
| JP | S63-108726 U | 7/1988 |
| JP | H07-171877 A | 7/1995 |
| JP | H09-220780 A | 8/1997 |
| JP | H11-105113 A | 4/1999 |
| JP | 2000-085039 A | 3/2000 |
| JP | 2001-030754 A | 2/2001 |
| JP | 2005-246721A A | 9/2005 |
| JP | 2006-103027 A | 4/2006 |
| JP | 2006-123210A A | 5/2006 |
| JP | 2007-504050 A | 3/2007 |
| JP | 2007-231136 A | 9/2007 |
| JP | 4192138 B2 | 9/2008 |
| JP | 4327275 B2 | 6/2009 |
| JP | 2010-155583 A | 7/2010 |
| WO | 2005/023599 A | 3/2005 |
| WO | 2006/106933 A1 | 10/2006 |
| WO | 2009/136489 A1 | 11/2009 |
| WO | 2010/050242 A1 | 5/2010 |

* cited by examiner (A)

(B)

(A)

(B)

(A)

(B)

METHOD OF MANUFACTURING A RESIN-LAMINATED BOARD

CROSS-REFERENCE TO RELATED APPLICATIONS

This application is a divisional of U.S. patent application Ser. No. 14/129,904, filed Dec. 27, 2013, which is a U.S. national phase application under 35 U.S.C. §371 of International Patent Application No. PCT/JP2012/066679, filed on Jun. 29, 2012, and claims benefit of priority to Japanese Patent Application Nos. 2011-144965, filed Jun. 29, 2011, and 2011-144967 filed Jun. 29, 2011. The International Application was published on Jan. 3, 2013 as International Publication No. WO2013/002366 under PCT Article 21(2). The entire contents of these applications are hereby incorporated by reference.

TECHNICAL FIELD

The present invention relates to a resin-laminated board. More specifically, the present invention relates to a resin-laminated board that can achieve higher stiffness while securing the weight and thickness reduction.

BACKGROUND

A so-called resin-laminated board has been employed as an interior material of an automobile, a building material, and a distributing and packaging material. A resin-laminated board has a front-side material made of resin and a backside material made of resin. The backside material of the resin-laminated board has a recess, and an end of the recess is butted on an inner surface of the front-side material. In particular, in the case of the interior material of an automobile and the building material, whose appearance is considered important, a nonwoven fabric is pasted on a front side of the front-side material. A variety of methods has been conventionally suggested for fabricating such a resin-laminated board. A first method employs a technique of fabricating a resin-laminated board through integral extruding blow molding with the use of molten resin. The resin-laminated board fabricated by this method has a recess for connecting the front-side material and the backside material. Thus, the stiffness (especially, the compression stiffness of a planar material relative to the load in the vertical direction) can be secured, compared with a hollow double-wall structure simply having a hollow part inside.

A second method employs a technique as disclosed in Japanese Patent No. 4327275. In this technique, a pair of rollers is used. One roller has a number of protrusions on a surface thereof. These protrusions are disposed in a houndstooth pattern on the surface of the roller. Two molten sheets extruded separately are pressed with a predetermined pressing force between the pair of rollers, thereby forming a recess in one sheet. The two sheets are welded in a state that the bottom of the recess is butted on an inner surface of the other sheet. Moreover, another sheet is welded on a surface of the one sheet that is provided with an opening of the recess. As a result, the sheet is welded on the front side and the backside of the sheet having the recess, and a three-layer structure is obtained.

A third method employs a technique as disclosed in Japanese Patent No. 4192138. Unlike the second method, in this technique, a number of protrusions are disposed in a houndstooth pattern on each surface of a pair of rollers. Two molten sheets extruded separately are pressed with a predetermined pressing force between the pair of rollers. On this occasion, the two sheets are welded to each other so that the recess is formed in each sheet and so that the bottoms of the corresponding recesses of the sheets are welded to each other. Further, other sheets are welded on the surfaces of the sheets on the opposite side. As a result, the sheets are welded on the surfaces of the sheets that are provided with the opening of the recess, and a four-layer structure is obtained. The technique as above for fabricating the resin-laminated board by extruding the molten sheets has technical problems as below.

One problem is that it is difficult to obtain a resin-laminated board with sufficient strength with no directivity while securing high fabrication efficiency. More specifically, the problem peculiar to the extrusion-molding common among the first and third methods is that the end processing such as a thermal sealing process is necessary because the end of the sheet in the extruding direction becomes open. This extra step deteriorates the fabrication efficiency as a whole. As another problem, it is difficult to secure enough welding time for welding the sheet provided with the recesses in a houndstooth pattern and the other sheet or welding the sheets provided with the recesses in a houndstooth pattern. This is because the welding is performed merely by the pressing force when the sheet is fed by the pair of rollers and conveyed between the rollers. Therefore, because of the insufficient welding, it is difficult to secure enough strength as the resin-laminated board. This leads to deterioration in quality. Such problems can be avoided by employing the blow molding instead of continuous extrusion molding. The blow molding can avoid the deterioration in fabrication efficiency due to the end processing as above and avoid the lack of strength due to the insufficient welding. JP-A-11-105113 discloses a method in which such blow molding is employed. JP-A-11-105113 discloses that a recess is provided for a backside wall (an end of the recess is butted on, and welded to the inner surface of a front-side wall) using a tubular parison in a molten state and that a mounting material is pasted on an outer surface of the front-side wall. However, the blow molding for performing the molding while a blowing pressure is applied using the tubular parison causes another technical problem. That is, the molding performed while a blowing pressure is applied using a tubular parison with uniform thickness in a circumferential direction makes it difficult to sufficiently reduce the weight and the thickness of the resin-laminated board.

More specifically, the tubular parison is generally extruded from an annular slit between die cores. Therefore, the tubular parison has a substantially constant thickness in the circumferential direction. Moreover, when a pair of split molds is clamped, the blowing pressure is applied from a sealed space in the mold. Thus, the pressing force relative to the mold of the parison is uniform across the entire surface of the parison. The parison pressed by one mold that forms the recess, however, produces a locally thin part due to the extension of the parison depending on the depth of the recess and the blow ratio based on the opening diameter. Meanwhile, such a thin part is not produced in the other mold that does not form the recess. In view of this, the thickness of the tubular parison needs to be set in accordance with the thin part of the one mold. This results in the formation of a sheet with extra thickness for the other mold. Thus, in the case of using the tubular parison with a substantially constant thickness in the circumferential direction, the difference in thickness is generated inevitably between the wall surface having a plurality of recesses after the blow molding and the wall surface not having the recess. Therefore, the sufficient reduction in weight and thickness of the resin-laminated board cannot be achieved. In this point, JP-A-7-171877 discloses a method of fabricating a plate-shaped body of a thermoplastic resin. In this method, a plate-shaped body is formed using two molten sheets based on the tubular parison. This plate-shaped body has a hollow part inside. Two surfaces of the plate-shaped body that face each other are provided with a plurality of recesses with the bottoms being adjacent to each other. However, it is preferable to avoid that one sheet is provided with a number of recesses with the openings thereof facing frontward. This is because, especially in the case of the resin-laminated board for the interior material for an automobile or a building material whose appearance is considered important, one sheet on the front side needs to have a decorative material, such as a nonwoven fabric, pasted thereon.

SUMMARY

In order to solve the above problems, the following fabrication technique is effective. The cavity of one of the split molds is provided with a plurality of protrusions protruding toward the other mold. With the split molds, two molten sheet materials made of a thermoplastic resin are positioned between the split molds. Then, a sealed space is formed between one sheet material and the cavity of the one split mold. The sealed space is evacuated from the one split-mold side. Through this evacuation operation, the protrusions form a plurality of recesses in the sheet material. By clamping the pair of split molds, the bottom of the recess can be welded to the other sheet material. As a result, a resin-laminated board with a hollow structure reinforced by a plurality of ribs can be obtained.

The two sheet materials can be maximally reduced in thickness using such a fabrication technique, thereby leading to reductions in weight and thickness while securing their fabrication efficiencies and product qualities.

Incidentally, the further improvement of the quality of the resin-laminated board typified by an interior material for vehicles has been desired. The further reduction of the weight and the improvement of the stiffness of the laminate board have been anticipated. As an application of the resin-laminated board, a floorboard is given. The floorboard covers a tire housing part capable of housing a spare tire and opening upward. From the viewpoint of widely utilizing the space of the trunk of a vehicle, the laminate board makes contact with a member disposed in its periphery (such as a spare tire) and interferes therewith. Therefore, in the specific usage mode, a flat plate shape with uniform thickness is not preferable for the laminate board. In other words, the laminate board needs to have a thin-plate part and a thick-plate part in consideration of the relation with the member disposed in the periphery as appropriate. Even though the laminate board with small weight and high stiffness can be obtained by adjusting the thickness as appropriate according to the above fabrication technique using the split molds, the laminate board still has room for improvement for higher stiffness of the laminate board.

In view of this, the present invention is to provide a resin-laminated board that can achieve higher stiffness while securing the weight and thickness reduction.

A resin-laminated board having two sheets layered on each other with a hollow part interposed therebetween, one sheet having a plurality of recesses formed by recessing the sheet into the hollow part and the two sheets being connected to each other with a plurality of ribs by welding bottoms of these recesses to the other sheet, the resin-laminated board includes: a thin-plate part having a plurality of first recesses; and a thick-plate part having a plurality of second recesses with larger depth than the first recesses. The first recesses and the second recesses are arranged at substantially the same pitch.

The first recesses and the second recesses are formed to have a truncated conical shape extending from the bottom toward opening; and a tilt angle of a slope of the truncated conical shape of each of the first recesses and the second recesses is adjusted to make an opening diameter of the first recesses and an opening diameter of the second recesses have the same size and to make a bottom diameter of the first recesses and a bottom diameter of the second recesses have the same size.

The resin-laminated board is a structure in which both ends of the one sheet are supported and a central part of the other sheet receives a deflection load; and a region on a central side as compared with the both ends that are supported is partially or entirely used as the thick-plate part.

Regions extending in a band-like shape are provided, each region connecting between the both ends that are supported; the band-like regions are provided in plural lines in a direction orthogonal to a direction where the region extends; and the band-like regions provided in plural lines are used as the thick-plate part.

The resin-laminated board is a structure in which both ends of the one sheet are supported and a central part of the other sheet receives a deflection load; and a region including the both ends that are supported and extending along an outer periphery in predetermined width is provided, and the region extending along the outer periphery is used as the thick-plate part.

The resin-laminated board is an interior material for a vehicle having a rectangular external shape when viewed from above; and the both ends that are supported correspond to opposite sides of the one sheet.

In an aspect of the invention, the resin laminate board is configured from the thin-plate part having the plural first recesses and the thick-plate part thicker than the thin-plate part and having the plural second recesses with relatively large depth, and the first recesses and the second recesses are disposed at substantially the same pitch.

This makes it possible to prevent the interference with the member disposed in the periphery and to form a region where the thickness is necessary to suppress deformation as the thick-plate part and form the other region as the thin-plate part in the resin-laminated board. That is, the thin-plate part and the thick-plate part can be combined reasonably. Moreover, by adjusting the thickness of the sheet, the stiffness of the resin-laminated board can be increased without increasing the mass.

Additionally, the first recesses and the second recesses are disposed at substantially the same pitch. Therefore, the stiffness of the resin-laminated board can be homogenized. At the same time, the workability and moldability of the mold can be increased, and the appearance is improved.

The two resin sheets can be maximally reduced in thickness while securing their necessary strengths to achieve reductions in weight and thickness.

According to the present invention, therefore, a fabrication technique for the resin-laminated board that can improve the stiffness further while securing the weight and thickness reduction can be provided.

In another aspect of the present invention, each of the first recesses and the second recesses is formed to have a truncated cone shape. Moreover, the opening diameter of the first recesses and the opening diameter of the second recesses are the same. Additionally, the bottom diameter of the first recesses and the bottom diameter of the second recesses are the same.

In the case of molding the two kinds of recesses with different depths into the truncated conical shape, the tilt angle of the recesses can be set to be the same. In this case, if the two kinds of recesses are formed to have the same opening diameter, the bottom diameter thereof becomes different. On the other hand, if the two kinds of recesses are formed to have the same bottom diameter, the opening diameter thereof becomes different. If the molded product includes such two kinds of recesses with the different opening diameter or bottom diameter, the stiffness of the molded product becomes inhomogeneous. This is not preferable in the working of the mold and the molding of the thick-plate part.

In this regard, the tilt angle of each of the first recesses and the second recesses is adjusted in the present invention. This makes it possible for the first recesses and the second recesses with different depths to have the same opening diameter and bottom diameter. Thus, the stiffness of the resin-laminated board can be homogenized. Moreover, the workability of the mold and the moldability of the thick-plate part can be increased.

In a further aspect of the present invention, the resin-laminated board can be used as a structure where the both ends of one sheet are supported and a central part of the other sheet receives the deflection load. In this case, a part of or the entire region on the central side as compared with the both ends supported is used as the thick-plate part.

The present inventors conducted the analysis based on CAE (Computer Aided Engineering). From the results of the analysis, the present inventors have found that, by forming a part of or the entire region on the central side as the thick-plate part in the resin-laminated board, the stiffness increased without increasing the mass. As a result, the stiffness can be further increased reasonably.

In an aspect of the present invention, band-like regions each connecting between the both ends that are supported are formed in plural lines, and the regions are used as the thick-plate part. The analysis of the present inventors based on CAE proved that it was effective to use such band-like regions as the thick-plate part. Thus, the stiffness can be increased reasonably without increasing the mass of the resin laminate board.

In another aspect of the present invention, a region including the both ends that are supported and extending along an outer periphery in predetermined width is used as the thick-plate part. The analysis of the present inventors based on CAE proved that it was effective to use such a region extending along the outer periphery as the thick-plate part. Thus, the stiffness can be increased reasonably without increasing the mass of the resin-laminate board.

In a further aspect of the present invention, the resin-laminated board is an interior material for a vehicle where an external shape is rectangular when viewed from above, and the both ends that are supported correspond to opposite sides of the one sheet. According to the present invention, the interior material for a vehicle that can achieve high stiffness while securing the weight and thickness reduction can be provided.

BRIEF DESCRIPTION OF THE DRAWINGS

FIG. 4 is a sectional view thereof illustrating the periphery of a thin-plate part.

FIG. 6 is a diagram illustrating the arrangement of the recesses.

FIG. 7(A) is a sectional view taken along line C-C of FIG. 6, and FIG. 7(B) is a sectional view of another example.

FIG. 16(A) is a sectional view taken along line 5-5 of FIG. 15, and FIG. 16(B) is a sectional view of another example.

FIG. 17(A) is a plan view of a basic model, and FIG. 17(B) is a view along an arrow B.

FIG. 27(A) is a diagram illustrating a state in the middle of molding of the sheet material, and FIG. 27(B) is a diagram illustrating a state in which the molding of the sheet material has finished.

DETAILED DESCRIPTION

A usage example of a resin-laminated board is described.

An example for carrying out the present invention is hereinafter described in detail with reference to the attached drawings. The same element throughout the description of the examples is denoted by the same reference symbol.

Figure 1:
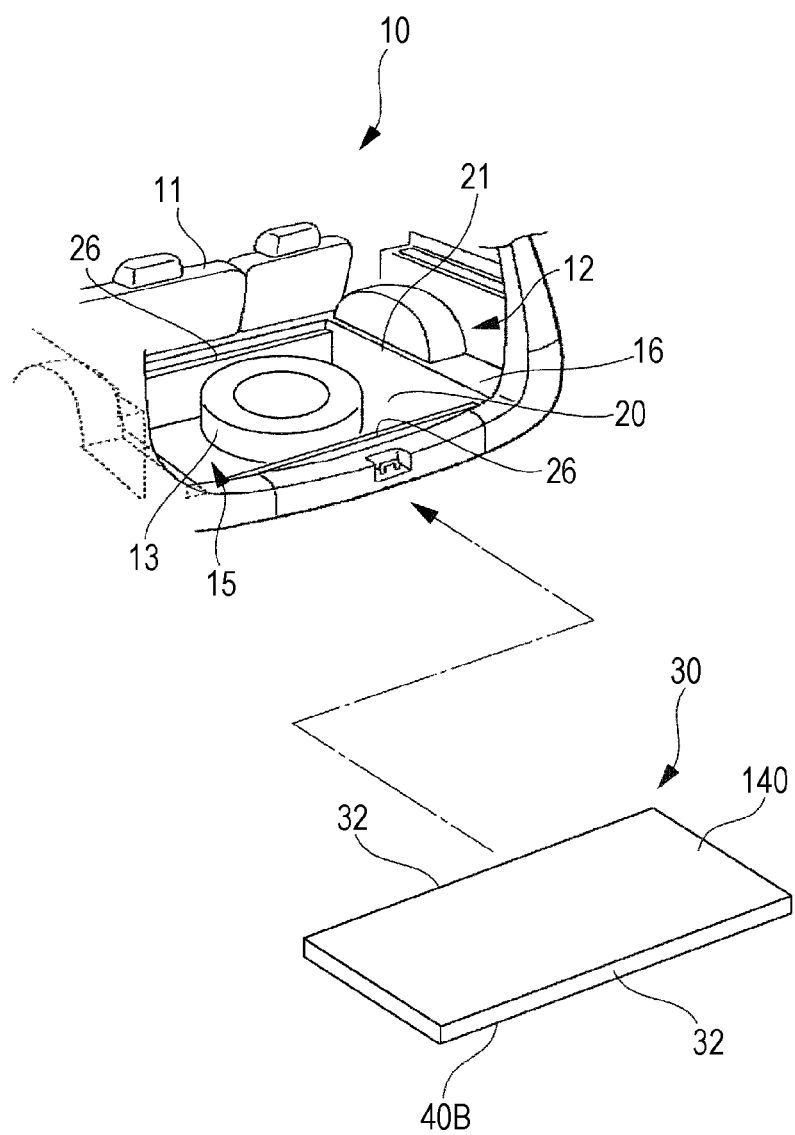
FIG. 1 is a perspective view of a tire housing structure for a vehicle.

FIG. 1 is a perspective view of a tire housing structure including a floor panel for a vehicle (hereinafter simply referred to as a floor panel), which is a resin-laminated board according to the present invention. As illustrated in FIG. 1, a vehicle 10 has a trunk 12 behind a rear seat 11. Below the trunk 12, a tire housing structure 15 for housing a spare tire 13 is provided. The tire housing structure 15 includes as main elements, a tire housing part 20 with an substantially box-like shape opening upward at a floor 16, and a floor panel 30 with any external shape (in this example, an substantially rectangular shape when viewed from above the vehicle) covering an opening 21 of the tire housing part 20.

Figure 2:
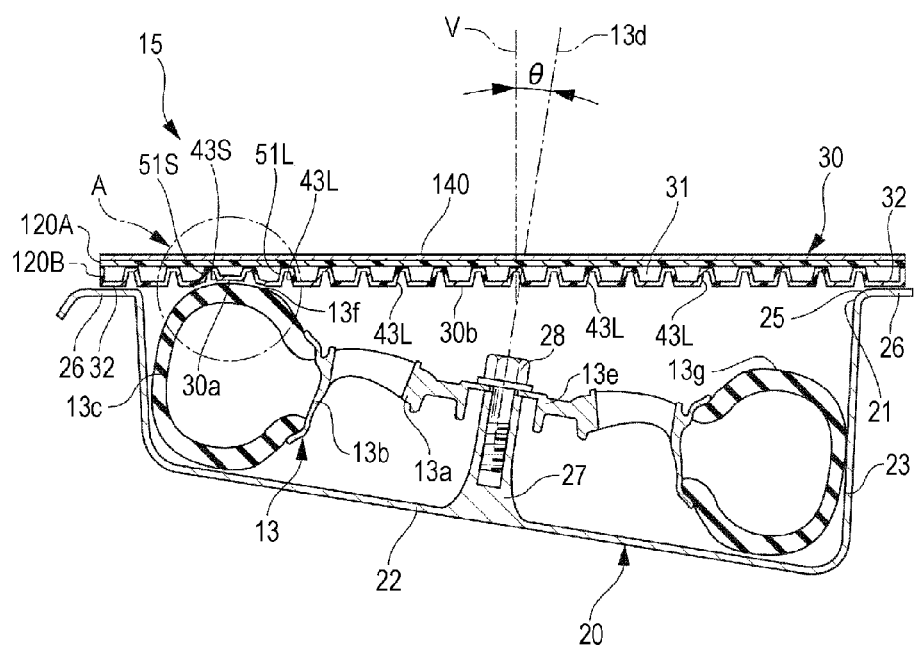
FIG. 2 is a sectional view of the tire housing structure illustrated in FIG. 1 for describing the structure of a floor panel for a vehicle according to a first example.
Figure 3:
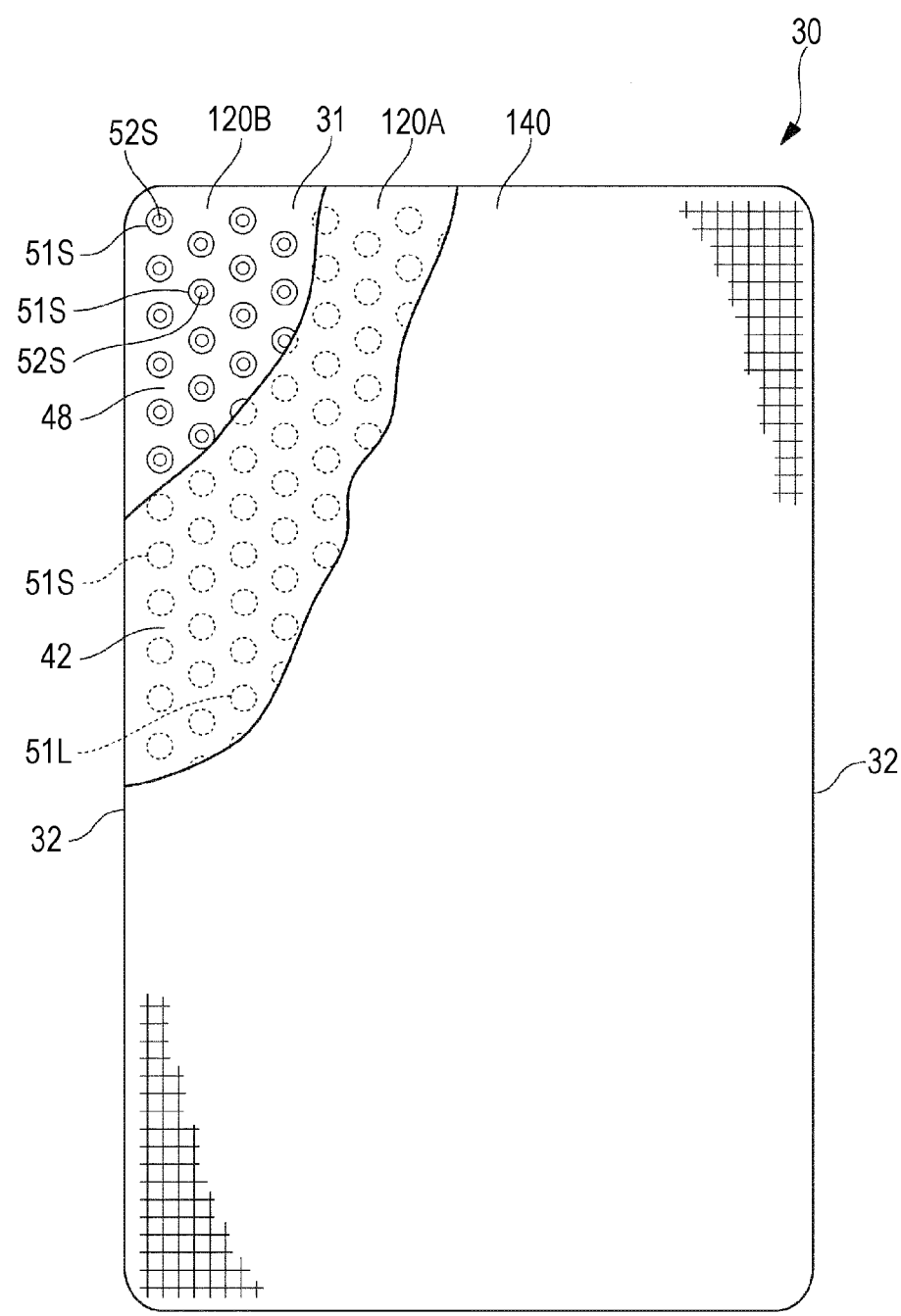
FIG. 3 is a plan view of the floor panel for a vehicle according to the first example.

Each part of the tire housing structure 15 is specifically described based on FIG. 2 and FIG. 3. As illustrated in FIG. 2, the tire housing part 20 includes a bottom 22, a peripheral wall 23, and a support part 26. The bottom 22 supports the spare tire 13. The peripheral wall 23 rises from the outer periphery of the bottom 22. The support part 26 is provided at predetermined positions of an opening periphery 25 at an upper end of the peripheral wall 23 (for example, a front side and a backside of the opening periphery 25). The opening periphery 25 is formed in a substantially horizontal direction when viewed from a side of the vehicle.

The spare tire 13 includes a wheel part 13a, a rim part 13b, and a tire part 13c. The rim part 13b is provided for the outer periphery of the wheel part 13a. The tire part 13c is attached to the outer periphery of the rim part 13b. In this example, the spare tire 13 is housed in the tire housing part 20 in a posture that an axial line 13d thereof is tilted backward at an angle of 0 relative to a vertical line V because of the arrangement of various components in the rear of the vehicle.

Therefore, the bottom 22 of the tire housing part 20 is tilted backward. Further, on a top surface of the bottom 22, a support cylinder 27 is tilted backward at an angle of 0. A hub part 13e of the wheel part 13a is fastened to this support cylinder 27 with a bolt 28. In the present invention, the structure for housing the spare tire in the tire housing part and the means for fixing the spare tire are not particularly limited and can be selected from various housing structures and various fixing means as appropriate.

The spare tire 13 is housed in the tire housing part 20 in a backward tilted posture. Therefore, a front upper part 13f of the spare tire 13 is positioned at substantially the same height as the opening periphery 25 and can be abutted on the floor panel 30. On the other hand, a back upper part 13g of the spare tire 13 is positioned lower than the opening periphery 25; therefore, a sufficient gap is generated between the spare tire 13 and the floor panel 30.

Subsequently, the structure of each part of the floor panel 30 is described with reference to FIG. 3 to FIG. 5. As illustrated in FIG. 3, the floor panel 30 has a three-layer structure including a front-side sheet 120A, a backside sheet 120B, and a decorative material sheet 140. The backside sheet 120B overlaps on the front-side sheet 120A through a hollow part 31. The decorative material sheet 140 is pasted on the front-side sheet 120A. Opposite sides of the floor panel 30 (here, long side parts 32 facing each other in a front-back direction of the vehicle) are supported by the support part 26 (see FIG. 2).

Figure 4:
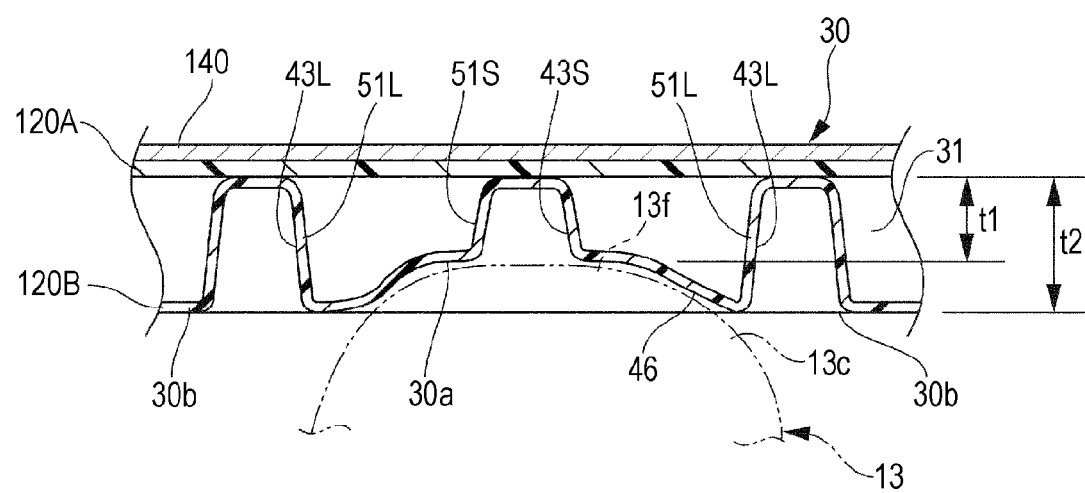
FIG. 4 is a magnified view of a part A of FIG. 2. In other words.

As illustrated in FIG. 4, the front-side sheet 120A and the backside sheet 120B are connected with a plurality of recesses 43S and 43L (later described) provided for the backside sheet 120B. The backside sheet 120B has a thin-plate part 30a and a thick-plate part 30b. The thin-plate part 30a can be abutted on the front upper part 13f of the spare tire 13 and is recessed upward. The thick-plate part 30b is not abutted on the spare tire 13. In order to illustrate the difference from the thickness t2 of the thick-plate part 30b, the thickness of the thin-plate part 30a is denoted by one reference symbol t1 for convenience in FIG. 4. The thickness of the thin-plate part 30a, however, is not limited thereto and is sometimes unstable.

The shape of the bottom of the thin-plate part 30a is set arbitrarily in accordance with the mode of the spare tire 13. Here, the bottom of the thin-plate part 30a has a curved shape in accordance with the front upper part 13f. The thickness t1 of the thin-plate part 30a is set arbitrarily in accordance with the shape of the bottom of the thin-plate part 30a. For example, if the bottom of the thin-plate part 30a has a curved shape, the thickness t1 of each part of the thin-plate part 30a can be smoothly changed. If the bottom of the thin-plate part 30a has a flat shape that is parallel to the bottom of the thick-plate part 30b, the thickness t1 of each part of the thin-plate part 30a can be set to substantially constant thickness.

Figure 5:
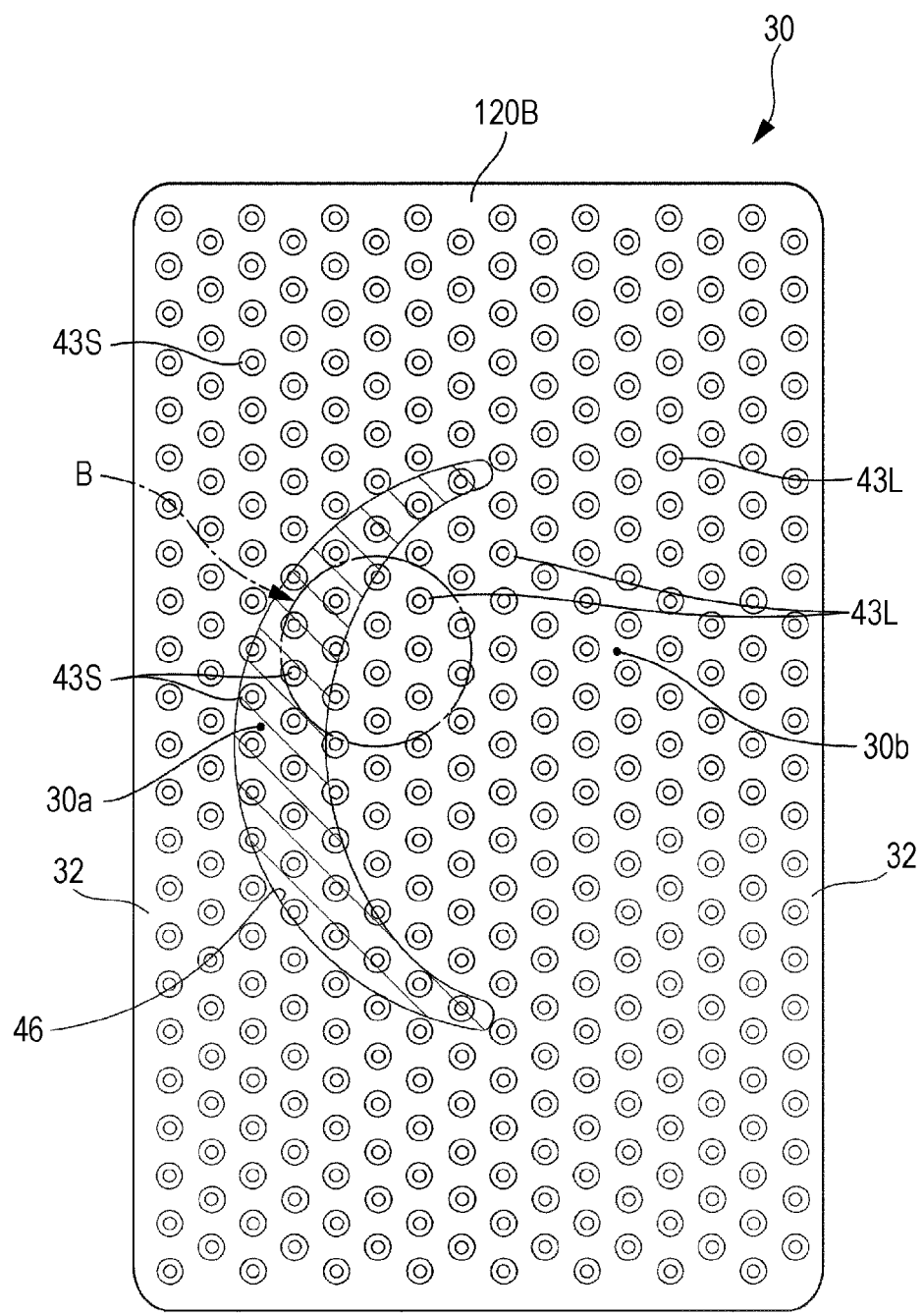
FIG. 5 is a bottom view of the floor panel for a vehicle according to the first example.

As illustrated in FIG. 5, the thin-plate part 30a is formed in a region with a substantially crescent shape when the vehicle is viewed from the bottom (region illustrated with oblique lines) so that the front upper part 13f (see FIG. 2) is escaped. On the other hand, the thick-plate part 30b is the other part than the thin-plate part 30a. Most part of the floor panel 30 is constituted by the thick-plate part 30b with constant thickness.

Figure 6:
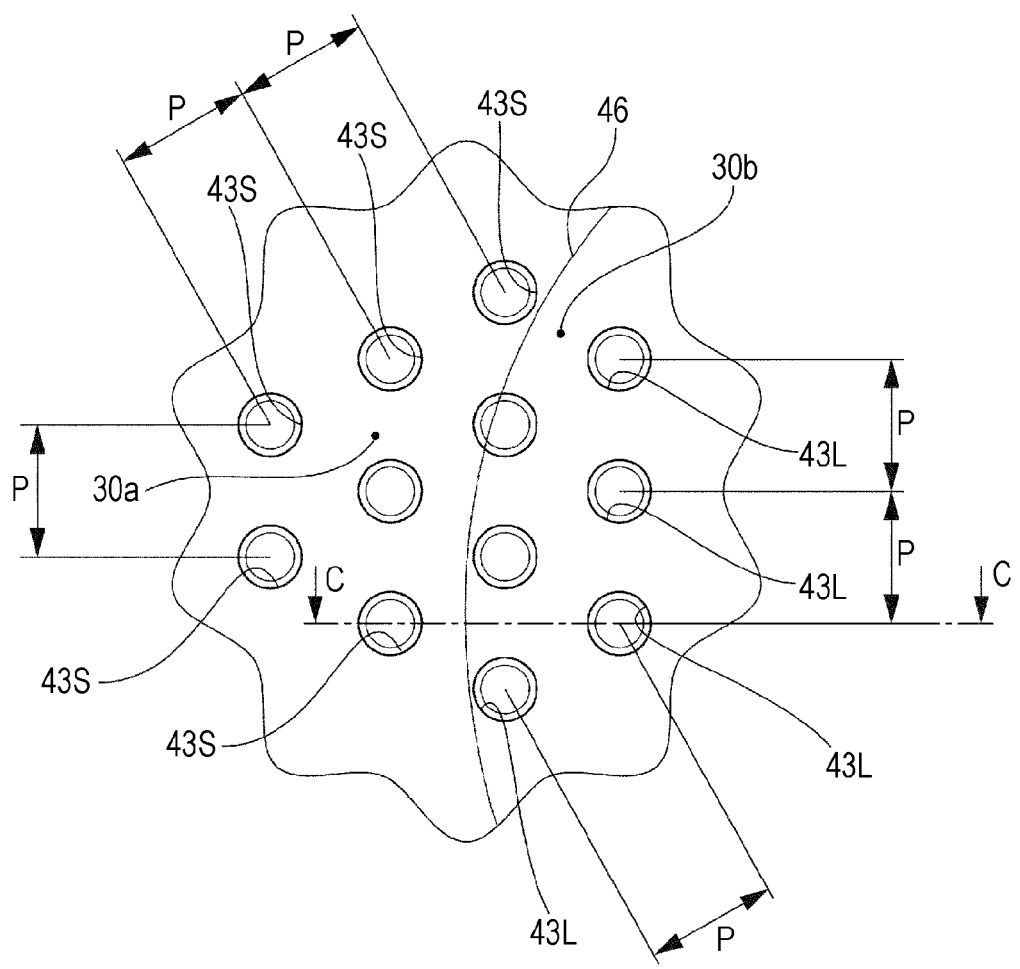
FIG. 6 is a magnified view of a part B of FIG. 5. In other words.
Figure 7:
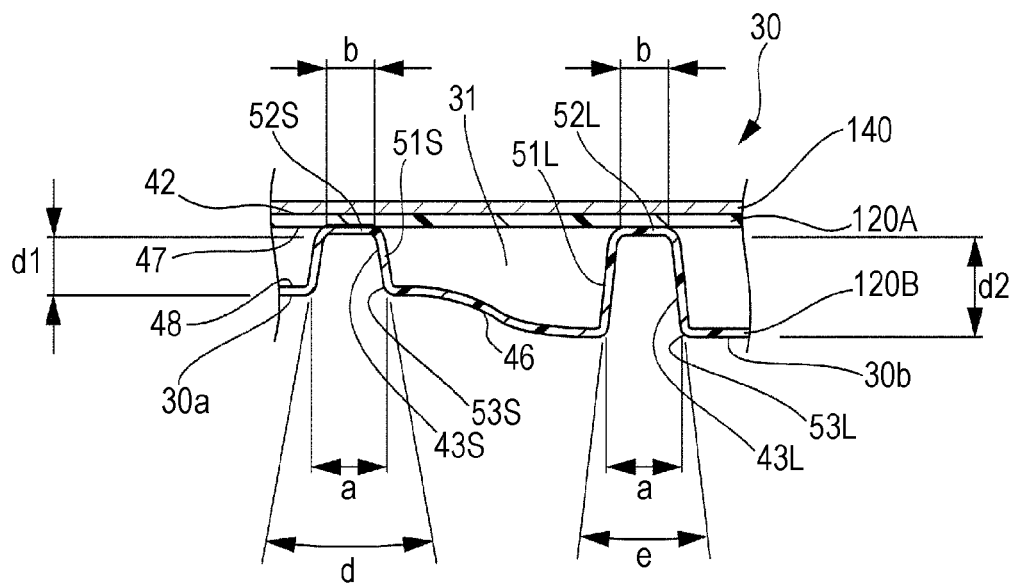
FIG. 7 are diagrams for describing the structure of the recesses.
Figure 7:
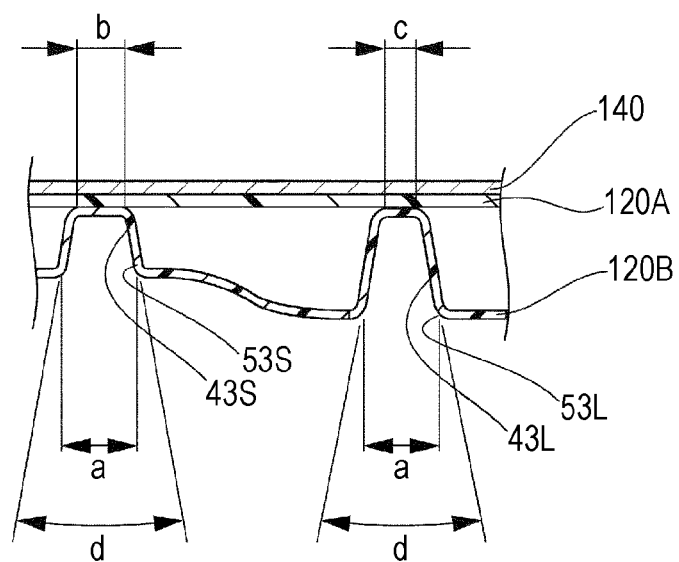

Next, the structure of the recesses 43S and 43L are described in detail with reference to FIG. 6 and FIG. 7. FIG. 6 is a magnified view of a part B of FIG. 5, which is for describing the arrangement of the recesses. FIG. 7 are diagrams for describing the structure of the recesses: FIG. 7(A) is a sectional view taken along line C-C of FIG. 6; and FIG. 7(B) is a sectional view of another example.

As illustrated in FIG. 6, the recesses 43S and 43L include a plurality of first recesses 43S provided for the thin-plate part 30a and a plurality of second recesses 43L provided for the thick-plate part 30b. The thickness of the thick-plate part 30b is larger than that of the thin-plate part 30a. Therefore, inevitably, the depth d2 of the second recesses 43S (see FIG. 7(A)) is relatively larger than the depth d1 of the first recesses 43S (see FIG. 7(A)). In the floor panel 30, the first recesses 43S and the second recesses 43L with different depths are arranged in a houndstooth pattern at substantially the same pitch P.

As illustrated in FIG. 7(A), the thin-plate part 30a and the thick-plate part 30b are connected via a step 46. The first recesses 43S and the second recesses 43L are welded to a lower surface 47 of the front-side sheet 120A. The lower surface 47 is a surface opposite to a top surface 42 to which the decorative material sheet 140 is welded. The first recess 43S and the second recess 43L constitute a first rib 51S and a second rib 51L for connecting between the lower surface 47 of the front-side sheet 120A and a top surface 48 of the backside sheet 120B, respectively. The first recess 43S and the second recess 43L have a truncated conical shape. In other words, the first recess 43S and the second recess 43L have a shape extending from the bottoms 52S and 52L toward the openings 53S and 53L.

The bottoms 52S and 52L are welded to the lower surface 47 of the front-side sheet 120A. The hollow part 31 is formed between the front-side sheet 120A and the backside sheet 120B. This hollow part 31 is closed at the peripheral end surface of the floor panel 30. The number of the first recesses 43S and the number of the second recesses 43L are set as appropriate in accordance with the quality required for the floor panel 30. As the numbers are larger, the stiffness of the resin-laminated board can be increased in proportion to the weight.

The opening diameter of the first recess 43S and the opening diameter of the second recess 43L are set to the same size a. Further, the bottom diameter of the first recess 43S and the bottom diameter of the second recess 43L are set to the same size b by adjusting the tilt angle "d" of the first recess 43S and the tilt angle "e" of the second recess 43L (specifically, tilt angle "d">title angle "e").

Note that if the thin-plate part 30a is recessed in a curved shape, the first recesses 43S are formed to have different depth. Even in this case, the tilt angle of the individual first recess 43S can be adjusted. In a state where the opening diameter and the bottom diameter of the individual first recess 43S are set to the same size as those of the second recess 43L, the first recesses 43S and the second recesses 43L can be provided at the same pitch. In other words, the distance between the centers and the distance between the opening edges of the first recesses 43S and the second recesses 43L are set to be the same so that the intervals of the first recesses 43S and the second recesses 43L are homogenized.

In this manner, by making the opening diameter and the bottom diameter of the first recesses 43S and the second recesses 43L the same, the stiffness of the floor panel 30 can be homogenized. Thus, the workability of the mold and the moldability of the thick-plate part 30b can be increased.

Further, the first recesses 43S and the second recesses 43L are disposed at the same pitch. Therefore, as illustrated in FIG. 7(B), it is possible to make the opening diameters "a" and the tilt angles "d" the same and to adjust the bottom diameter "c" (specifically, bottom diameter "b">bottom diameter "c"). In this manner, the first recess 43S and the second recess 43L are uniformly disposed in a state in which the first recess 43S and the second recess 43L have the same opening diameter and tilt angle. As a result, the stiffness of the floor panel 30 can be homogenized. Further, the workability of the mold and the moldability of the thick-plate part 100b can be increased.

The floor panel 30 with the above structure is manufactured by a manufacturing method as below. First, two sheet materials made of a thermoplastic resin are disposed in a molten state between a pair of split molds. The sheet materials correspond to the front-side sheet 120A and the backside sheet 120B. Next, one sheet material is recessed toward the other sheet material with the use of the plural protrusions provided for one split mold. Thus, the plural first recesses 43S and the plural second recesses 43L are formed. Subsequently, the pair of split molds is clamped. Thus, the bottoms 52S and 52L of the first recesses 43S and the second recesses 43L are welded to the other sheet material. Additionally, the two sheet materials are connected to each other with the plural first ribs 51S and the plural second ribs 51L, thereby providing the floor panel 30 with the hollow structure.

An effect of the floor panel 30 as aforementioned is described. The floor panel 30 can be molded from the two sheet materials instead of using a conventional tubular parison. Therefore, the sheet materials of the two sheets 120A and 120B can be maximally reduced in thickness, individually. Thus, the sheets 120A and 120B can be reduced in weight and thickness while securing their fabrication efficiencies and the product qualities.

Moreover, the front-side sheet 120A is not provided with the recesses. Therefore, the top surface 42 of the front-side sheet 120A is flat. Therefore, the top surface (design surface) of the decorative material sheet 140 provided for the top surface 42 of the front-side sheet 120A is also flat. As a result, the recesses 43S and 43L do not deteriorate the appearance of the floor panel 30.

The thin-plate part 30a is supported by the front upper part 13f (see FIG. 2) of the spare tire. Therefore, even though the thin-plate part 30a is thin, the deflection is suppressed. Meanwhile, the thick-plate part 30b is not supported by the spare tire 13 (see FIG. 2). However, since the thick-plate part 30b is thick, the deflection thereof is suppressed. In this manner, in the floor panel 30, the region where the thickness is necessary is formed of the thick-plate part 30b and the region that can be formed thinly is formed of the thin-plate part 30a. Thus, the thin-plate part 30a and the thick-plate part 30b can be combined reasonably, and the thicknesses of the sheets 120A and 120B can be adjusted. The stiffness thereof can be therefore increased without increasing the mass of the floor panel 30.

Further, the front upper part 13f (see FIG. 2) of the spare tire is fitted into the thin-plate part 30a by the step 46 between the thin-plate part 30a and the thick-plate part 30b. Therefore, the position of the floor panel 30 can be lowered by the length of the step between the thin-plate part 30a and the thick-plate part 30b. As a result, the space of the trunk 12 (see FIG. 1) can be enlarged.

In addition, the plural first recesses 43S and the plural second recesses 43L are arranged at substantially the same pitch P. Therefore, the stiffness of the floor panel 30 can be homogenized. At the same time, such arrangement increases the workability and moldability of the mold, thereby improving the appearance of the bottom side of the floor panel 30.

Next, a floor panel according to another example as a resin-laminated board of the present invention is described with reference to FIG. 8 and FIG. 9. Note that the parts common to those of the floor panel 30 in the above example are denoted by the same reference symbols and the description is not repeated.

Figure 8:
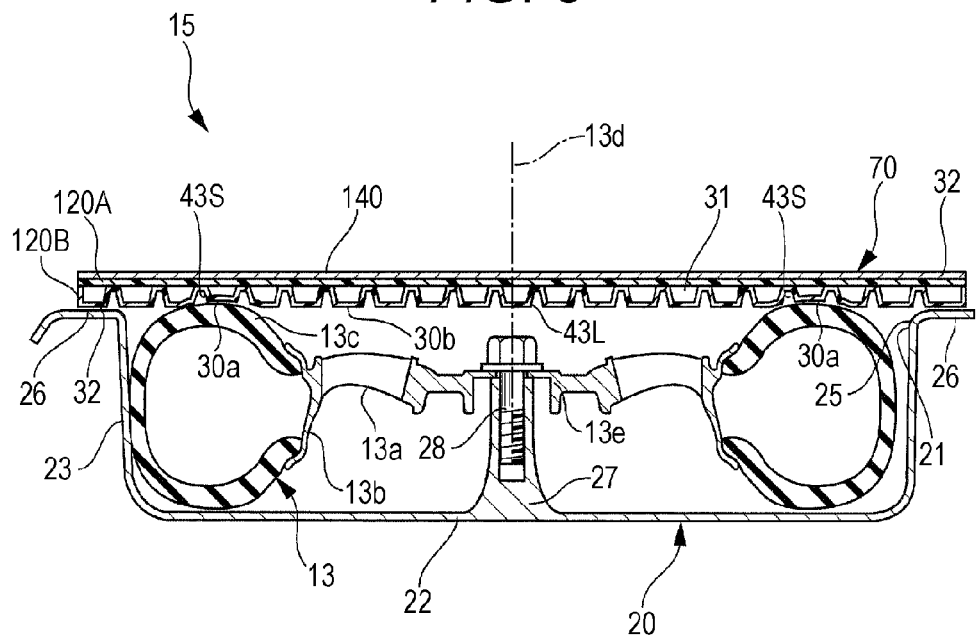
FIG. 8 is a diagram illustrating the structure of a floor panel for a vehicle according to a second example, and corresponds to FIG. 2.

As illustrated in FIG. 8, in the example, the spare tire 13 is housed in the tire housing part 20 in a posture that the axial line 13d is in the vertical direction. In this example, the bottom 22 of the tire housing part 20 is formed substantially horizontally. The spare tire 13 is disposed substantially horizontally along this bottom 22 and fixed with the bolt 28. The upper end of the housed spare tire 13 is positioned at substantially the same height as the opening periphery 25. In other words, the upper surface of the tire part 13c can be abutted on a floor panel 70 across the entire circumference. The backside sheet 120B of the floor panel 70 includes the thin-plate part 30a and the thick-plate part 30b. The thin-plate part 30 can be abutted on the top surface of the tire part 13c and is recessed upward. The thick-plate part 30b is not abutted on the spare tire 13.

Figure 9:
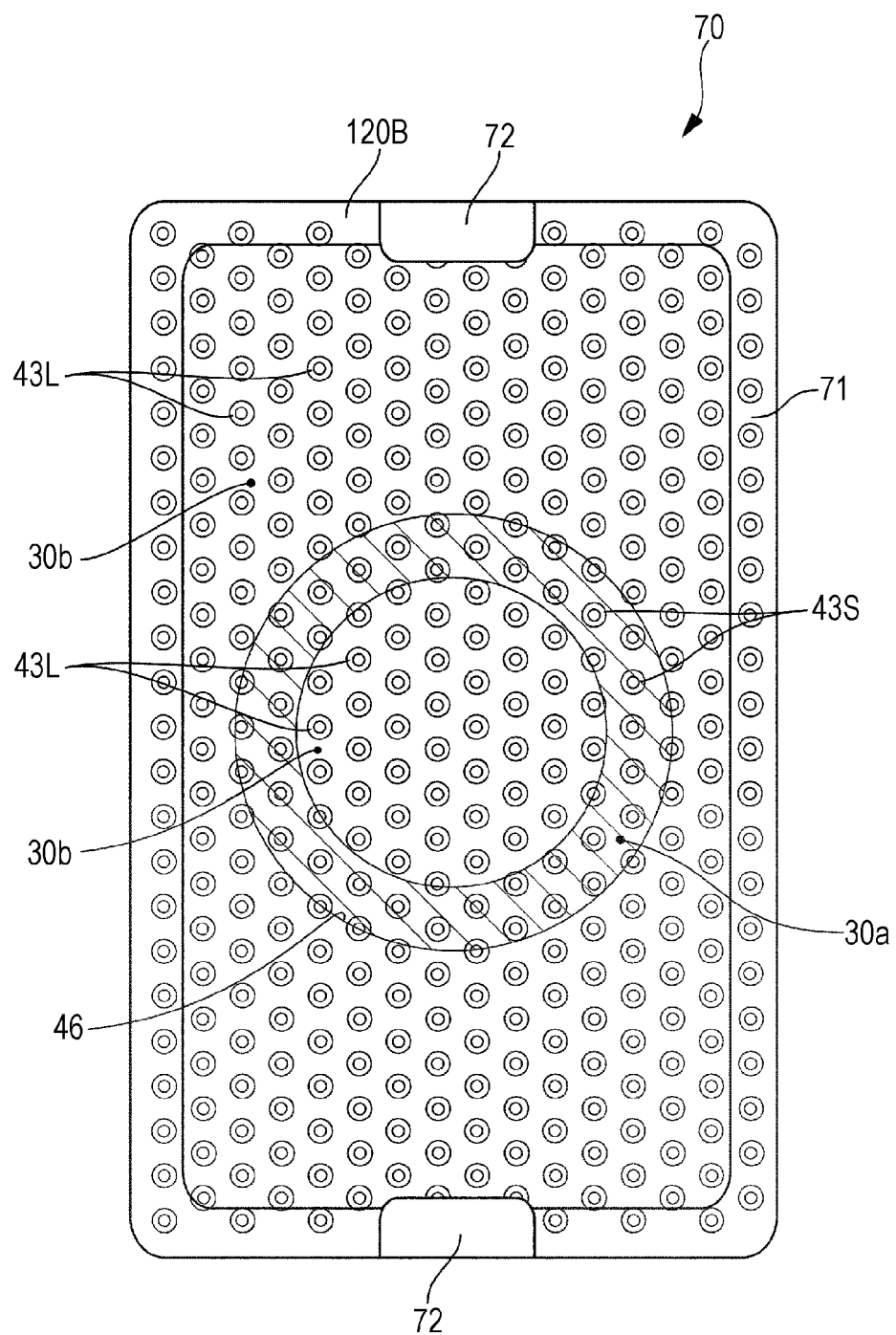
FIG. 9 is a bottom view of the floor panel for a vehicle according to a second example, and corresponds to FIG. 5.

As illustrated in FIG. 9, the thin-plate part 30a is formed in a mode suitable for the top surface of the tire part 13c (see FIG. 8). In other words, the thin-plate part 30a is formed in an annular region with substantially constant width (region illustrated with oblique lines) so that the entire circumference of the top surface of the tire part 13c (see FIG. 8) is escaped. Meanwhile, the thick-plate part 30b is formed in a region outside the thin-plate part 30a and a region surrounded by the thin-plate part 30a. In the floor panel 70 of the second example, in a manner similar to the floor panel 30 described in the first example, the plural first recesses 43S and the plural second recesses 43L with different depths are formed in a houndstooth pattern at substantially the same pitch P. By adjusting the tilt angles of the plural first recesses 43S and the plural second recesses 43L, the opening diameter and the bottom diameter of the plural first recesses 43S and the plural second recesses 43L are set to be the same.

The floor panel 70 of the second example can provide the similar operation effect to the floor panel 30 according to the first example. Additionally, the region of the thin-plate part 30a is formed more widely. Since this increases the region of the thin-plate part 30a, the material can be reduced. Thus, further weight and cost reduction can be achieved.

Note that a reinforcing part 71 thicker than the thick-plate part 30b may be formed along the outer periphery of the floor panel 70 to increase the stiffness of the entire floor panel 70. In order to make the floor panel 70 easily handled, a crushing part 72 may be formed on a side of the backside sheet 120B. This crushing part 72 can have a finger of a user inserted thereinto, and is thinner than the thick-plate part 30b. In this manner, in addition to the thick-plate part 30a and the thin-plate part 30a, function parts formed with predetermined thickness (reinforcing part 71 and crushing part 72) are further provided. As a result, the floor panel 70 having higher functionality can be provided.

Third Example

Figure 10:
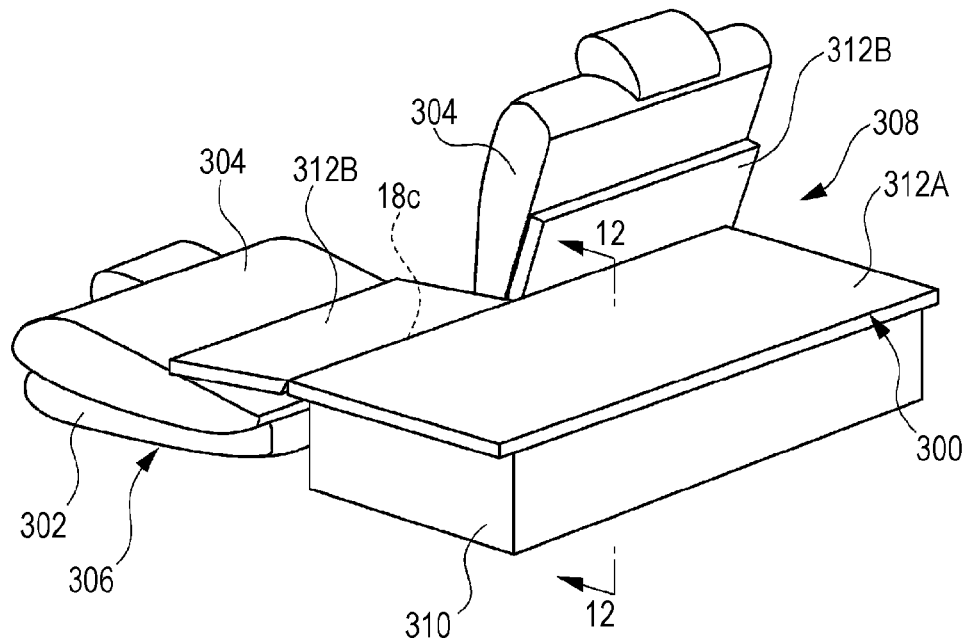
FIG. 10 is a perspective view of a rear part of the vehicle having the resin-laminated board mounted.
Figure 11:
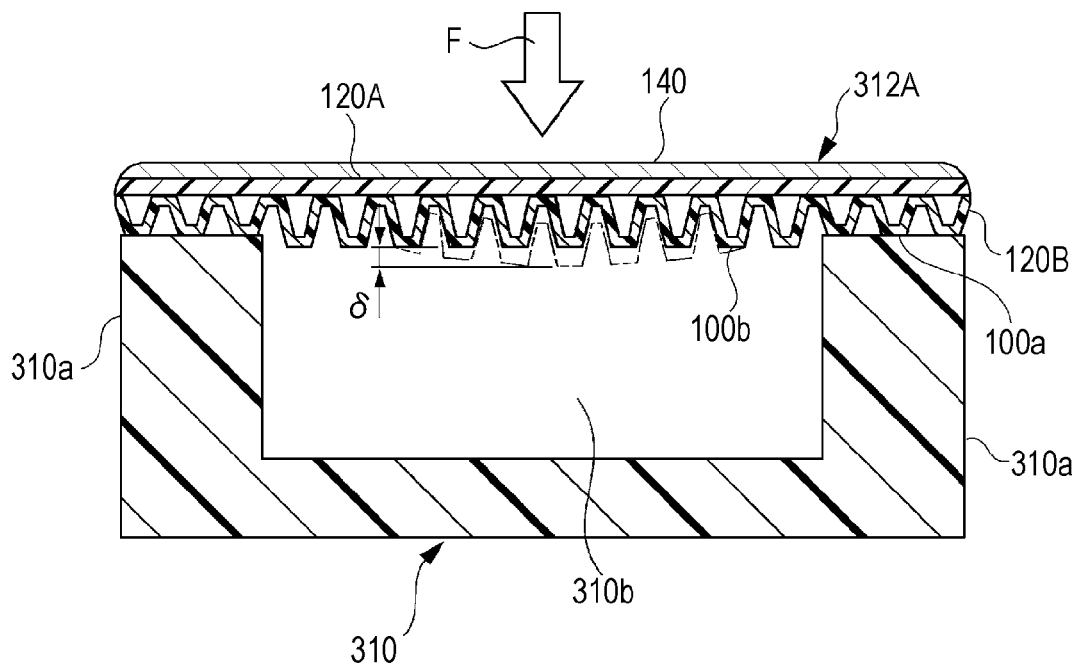
FIG. 11 is a sectional view taken along line 12-12 of FIG. 10.

Next, an example of using the resin-laminated board of the present invention as a deck board or an auxiliary board of an automobile is described based on FIG. 10 and FIG. 11. A rear seat 306 is provided in the rear of a vehicle. The rear seat 306 includes a rear seat cushion 302 and a pair of right and left rear seat backs 304. The rear seat backs 304 can be reclined back and front relative to the rear seat cushion 302. The rear seat backs 304 can be folded by being collapsed forward. Behind the rear seat backs 304, the trunk 12 is provided. In the trunk 12, a housing box 310 for housing tools and a deck board 300 are disposed.

The deck board 300 includes a deck board main body 312A and auxiliary board parts 312B and 312B. The deck board main body 312A is disposed to constitute the bottom of the trunk 12 and to cover the upper opening of the housing box 310. The auxiliary board parts 312B and 312B are a pair of right and left members that can be folded following the rising and reclining operations of the right and left rear seat backs 304.

The deck board main body 312A and the right and left auxiliary board parts 312B and 312B are interior materials for covering the opening of the housing box 310 and the space behind the lower part of the rear seat backs 304. These interior materials also serve as a support body on which pieces of baggage are mounted. For the deck board main body 312A and the right and left auxiliary board parts 312B and 312B for which the designability and the stiffness are required, the resin-laminated board (see FIG. 12, reference symbol 100) is used. Thus, the deck board 300 of high quality can be obtained.

Figure 30:
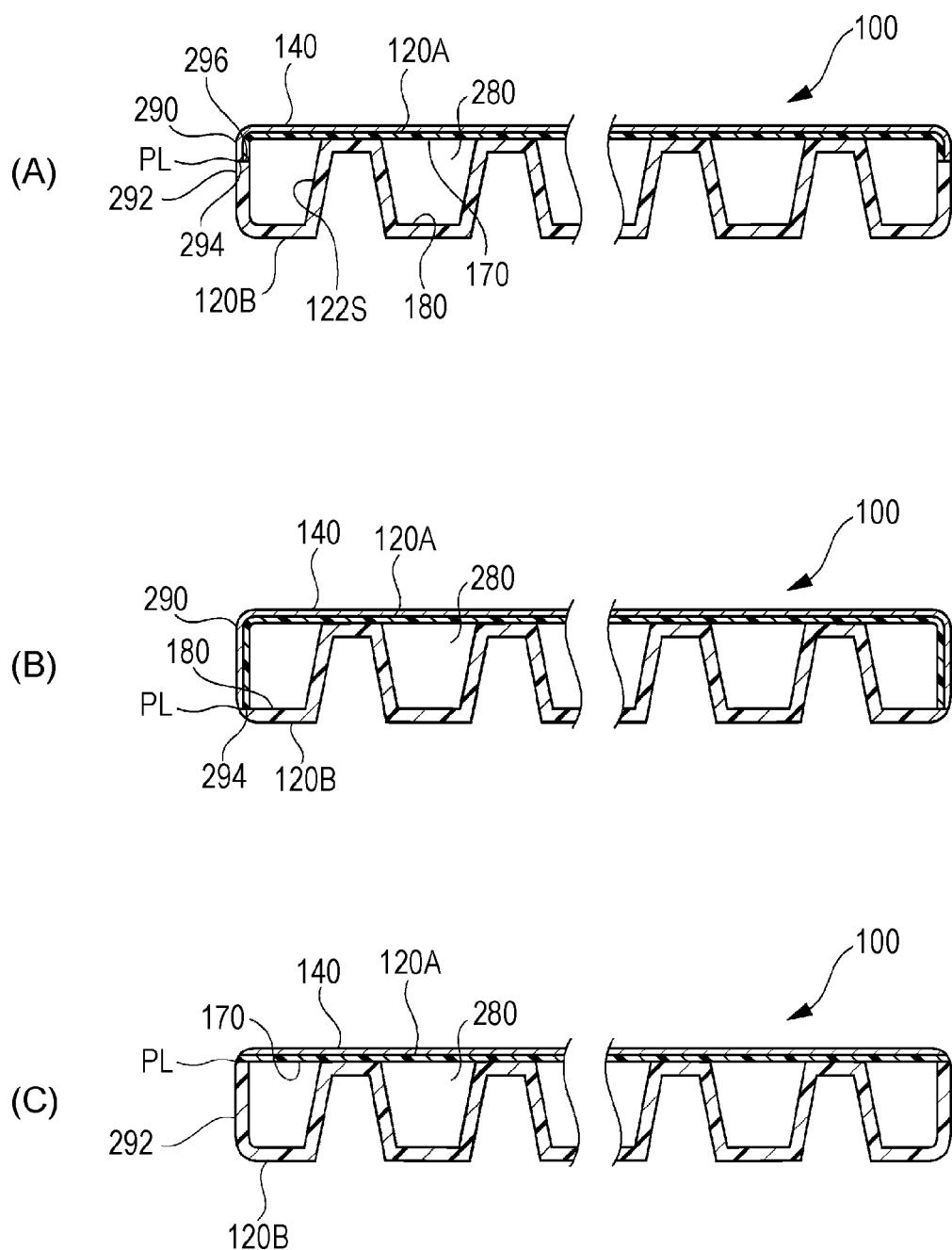
FIGS. 30((A), (B), and (C) are partially sectioned views illustrating the peripheral part of the resin-laminated board.

As illustrated in FIG. 30(A), each of the decorative material sheet 140 and the front-side sheet 120A has an edge 290 formed by curving the periphery toward one side. The backside sheet 120B has an edge 292 formed by curving the periphery toward one side. The outer peripheral surface of the outer peripheral wall is formed by abutting an end peripheral surface 294 of the edge 290 and an end peripheral surface 296 of the edge 292 to each other. When the outer peripheral surface of the outer peripheral wall is formed of the outer peripheral surface of the decorative material sheet 140 and the outer peripheral surface of the backside sheet 120B, a parting line PL extending in a circumferential direction on the outer peripheral surface is formed on the butting portion. However, the outer peripheral surface of the decorative material sheet 140 and the outer peripheral surface of the backside sheet 120B are continuously connected to each other in a smooth manner. In this structure, a joint or a step is not formed in the parting line PL as the boundary between the outer peripheral surface of the decorative material sheet 140 and the backside sheet 120B. Thus, the favorable appearance can be maintained.

A modified example of FIG. 30(A) is illustrated in FIG. 30(B). As illustrated in FIG. 30(B), each of the decorative material sheet 140 and the front-side sheet 120A may have the edge 290 formed by curving the periphery toward one side. On the other hand, the backside sheet 120B including the periphery may have a flat-plate shape. The outer peripheral surface of the outer peripheral wall may be formed by butting the end peripheral surface 294 of the edge 290 and an inner surface 180 of the backside sheet 120B.

Another modified example of FIG. 30(A) is illustrated in FIG. 30(C). As illustrated in FIG. 30(C), each of the decorative material sheet 140 and the front-side sheet 120A including the periphery thereof may have a flat-plate shape. On the other hand, the backside sheet 120B may have the edge 292 formed by curving the periphery toward one side in a manner similar to FIG. 30(A). The outer peripheral surface of the outer peripheral wall may be formed by butting an inner surface 170 of the front-side sheet 120A and the end peripheral surface 296 of the edge 292. In particular, in FIG. 30(B), the interior material for a vehicle is incorporated in the recess in a mode that the decorative material 14 is exposed to the inside of the vehicle. On this occasion, as compared with FIG. 30(A) and FIG. 30(C), the parting line is formed so deeply that the parting line is hardly observed. Therefore, the structure of FIG. 30(B) is advantageous in terms of the appearance as compared with the structures of FIG. 30(A) and FIG. 30(C). Therefore, the resin-laminated board 100 is effective for the use in the auxiliary plate for the floor panel for an automobile for which the designability is required.

Subsequently, an example of forming the deck board main body 312A with the use of the resin-laminated board (FIG. 12, reference symbol 100) is described with reference to FIG. 11. As illustrated in FIG. 11, the deck board main body 312A has a three-layer structure including the front-side sheet 120A, the backside sheet 120B, and the decorative material sheet 140. The deck board main body 312A has a rectangular external shape. In the deck board main body 312A, right and left ends corresponding to the short sides of the rectangle are supported by right and left side walls 310a and 310a of the housing box 310. Therefore, the deck board main body 312A covers a housing space 310b from above. On the deck board main body 312A, a load F indicated by a white arrow is applied by baggage, etc.

Figure 17:
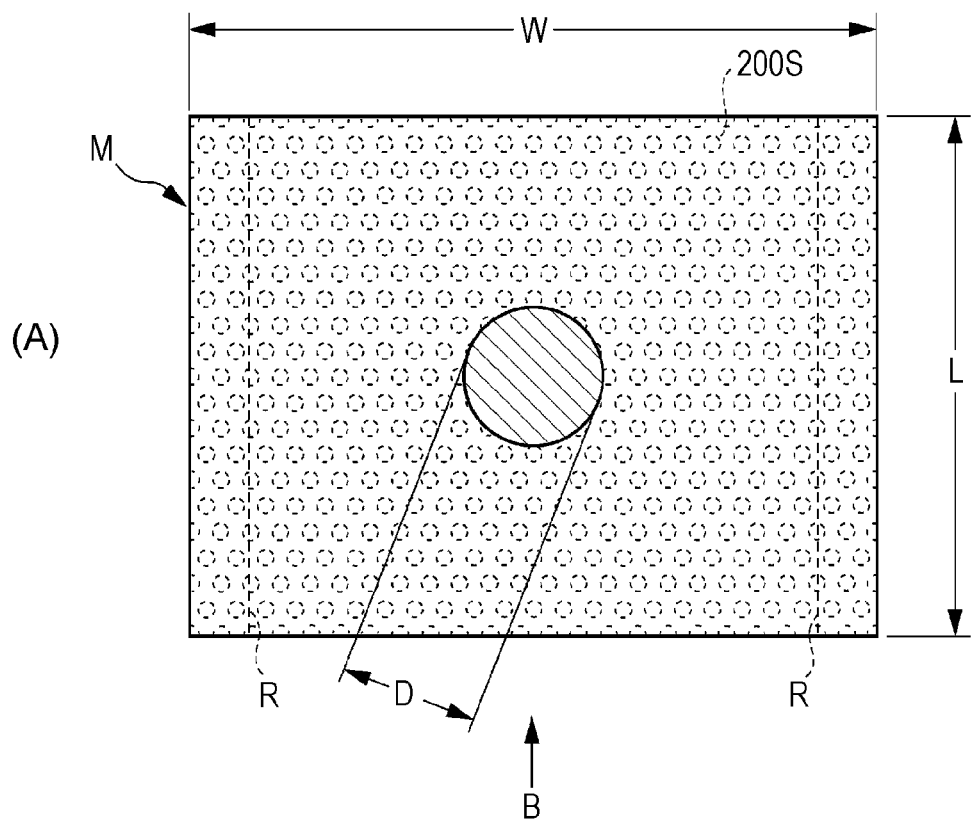
FIG. 17 are diagrams for describing the analysis conditions.
Figure 17:
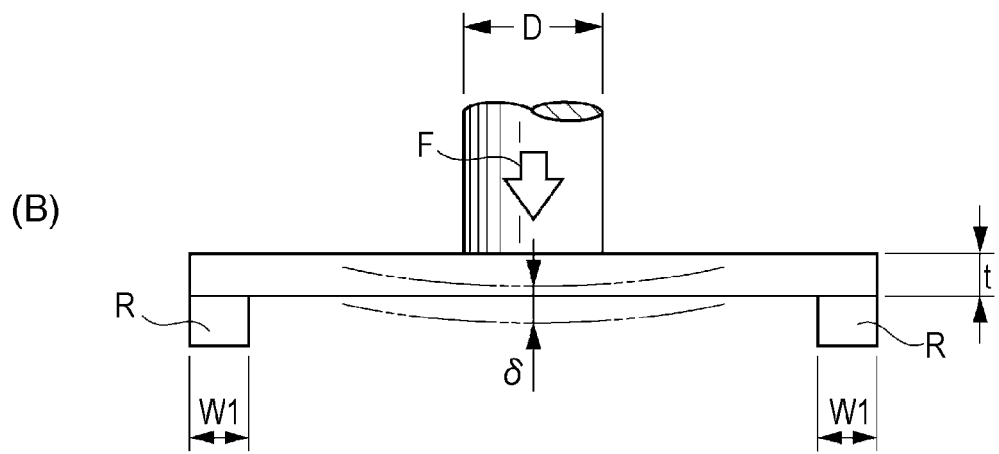

The right and left side walls 310a and 310a correspond to constraint parts in the CAE analysis example (reference symbols R in FIG. 17). The load F corresponds to the load (reference symbol F in FIG. 17(B)) in the CAE analysis example. In view of this, based on the CAE analysis results, the regions of the deck board main body 312A that are in contact with the side walls 310a and 310a (end parts on the short side) are formed of a thin-plate part 100a. Moreover, the region on the central side (on the housing space 310*b* side) as compared with the side walls 310*a* and 310*a* is partially or entirely formed of the thick-plate part 100*b*.

Then, even though the load F is applied onto the deck board main body 312A, the high stiffness of the thick-plate part 100*b* suppresses the amount of deflection δ. Thus, it is possible to provide the deck board main body 312A with high stiffness without increasing the mass.

Figure 12:
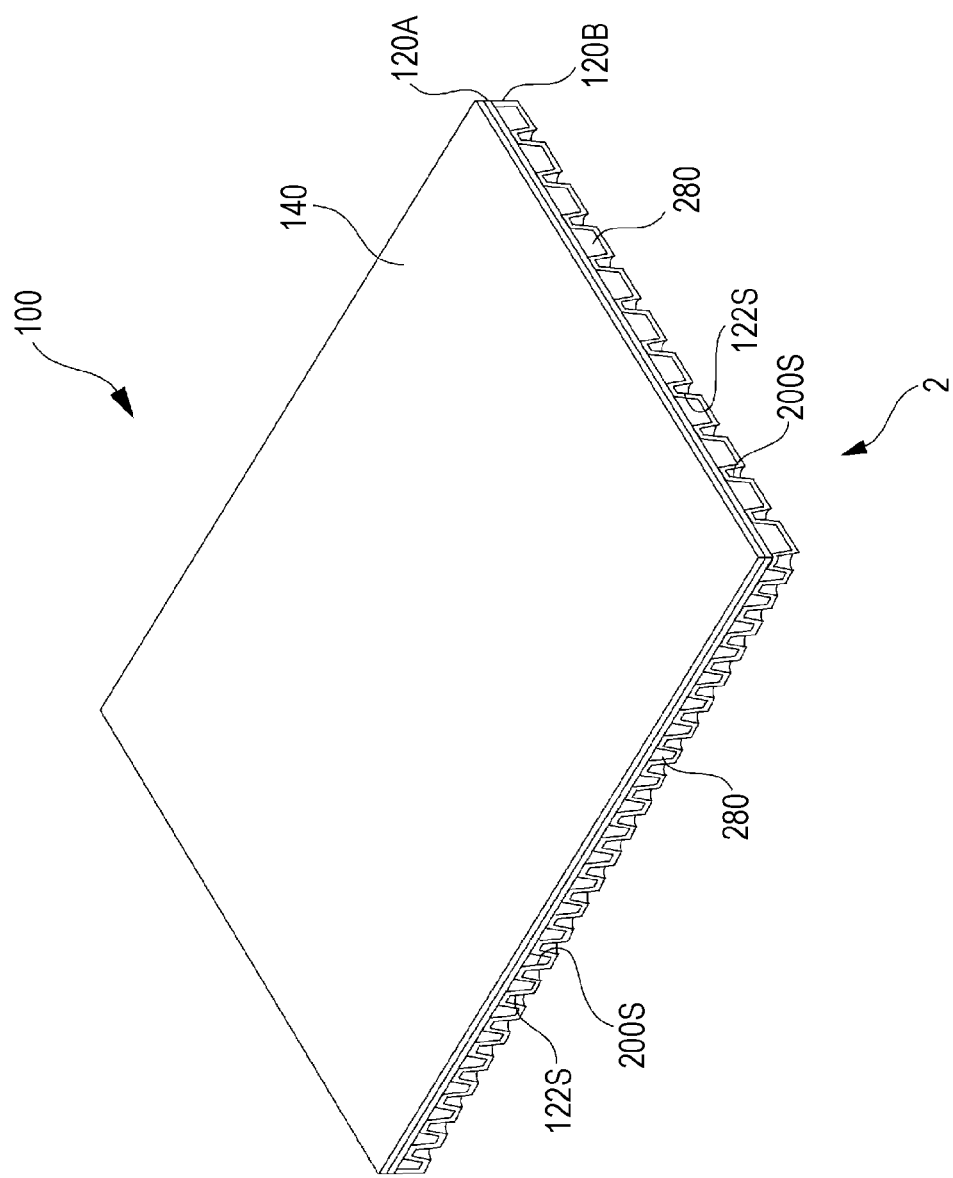
FIG. 12 is a perspective view of a section of a part of the resin-laminated board according to the present invention.

As illustrated in FIG. 12, the resin-laminated board 100 has a three-layer structure including the front-side sheet 120A, the backside sheet 120B, and the decorative material sheet 140. The decorative material sheet 140 is pasted on the outer surface of the front-side sheet 120A. The resin-laminated board 100 as above is used, for example, for an interior material for a vehicle. Note that in FIG. 1, in order to clearly illustrate the internal structure of the resin-laminated board 100, the peripheral part of the resin-laminated board 100 is omitted.

Figure 13:
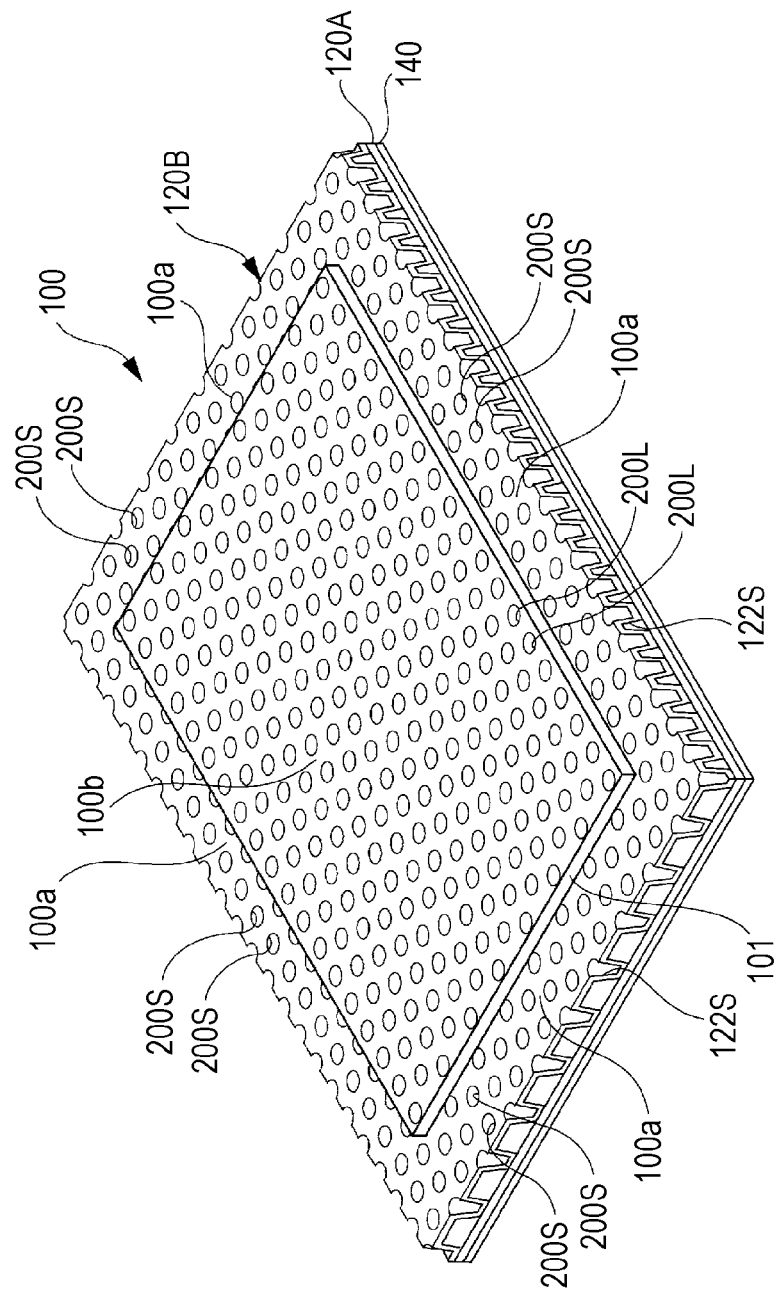
FIG. 13 is a perspective view of the resin-laminated board, illustrating a section of the backside of the portion illustrated in FIG. 12.

As illustrated in FIG. 13, the resin-laminated board 100 has the thin-plate part 100*a* and the thick-plate part 100*b*. The thin-plate part 100*a* has a plurality of first recesses 200S with small depth. The thick-plate part 100*b* has a plurality of second recesses 200L with large depth.

Figure 14:
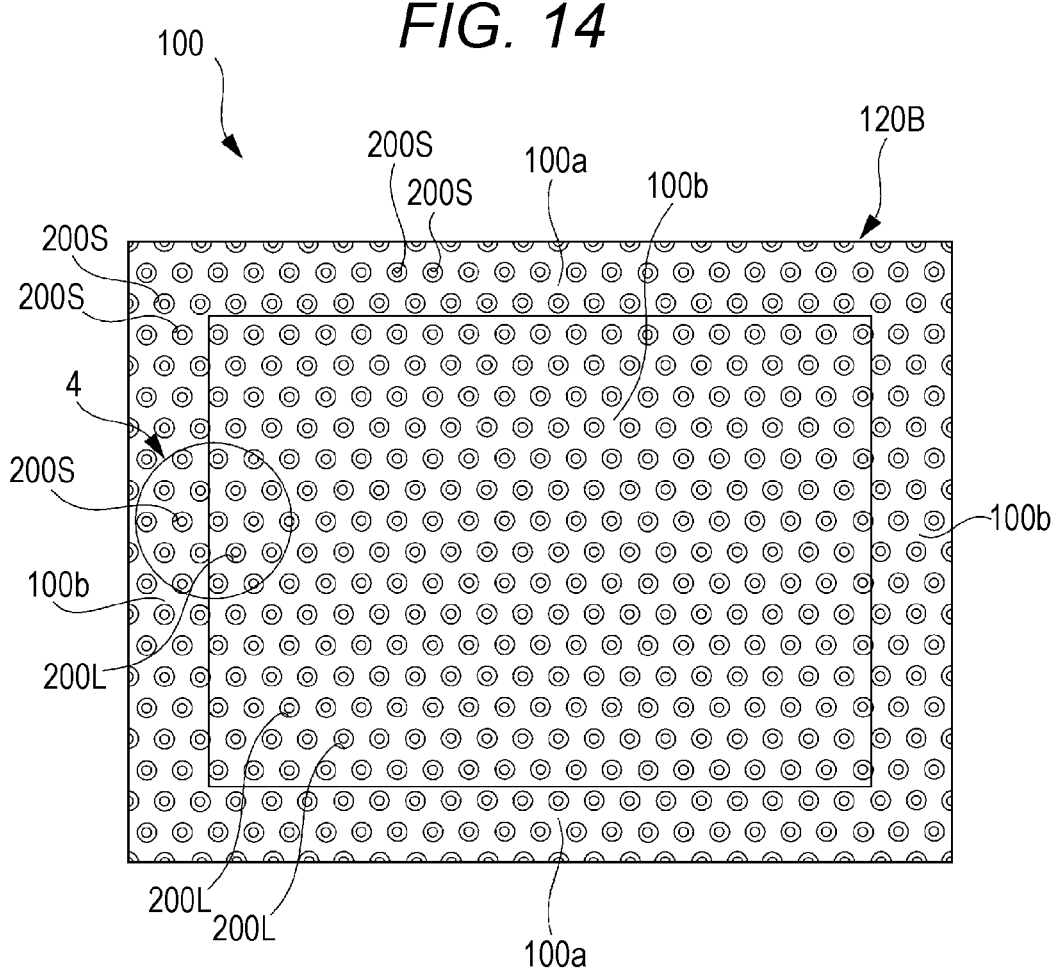
FIG. 14 is a bottom view of FIG. 13.

As illustrated in FIG. 14, the resin-laminated board 100 is formed so that the outer shape is rectangular. The thin-plate part 100*a* is formed to have constant width over the entire outer periphery in a region near each side. The thick-plate part 100*b* is formed in a region surrounded by the thin-plate part 100*a* in a region on the central side.

Figure 15:
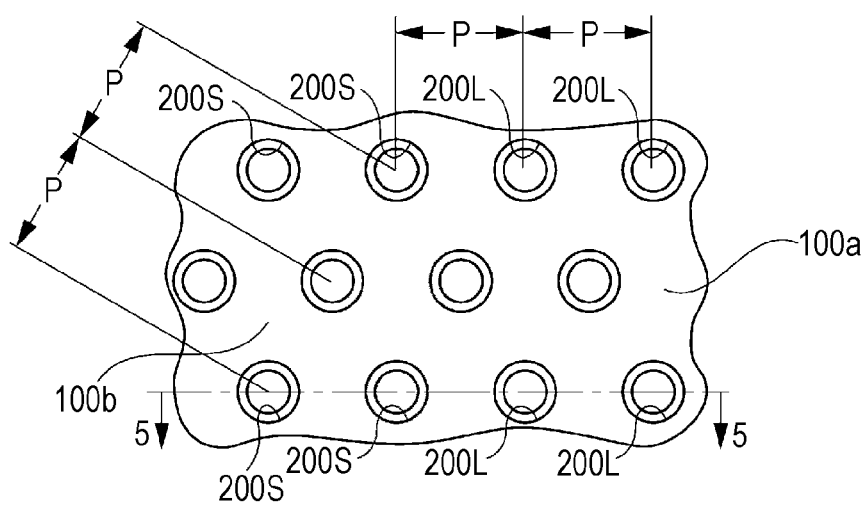
FIG. 15 is a magnified view of an element denoted by reference symbol 4 in FIG. 14.
Figure 16:
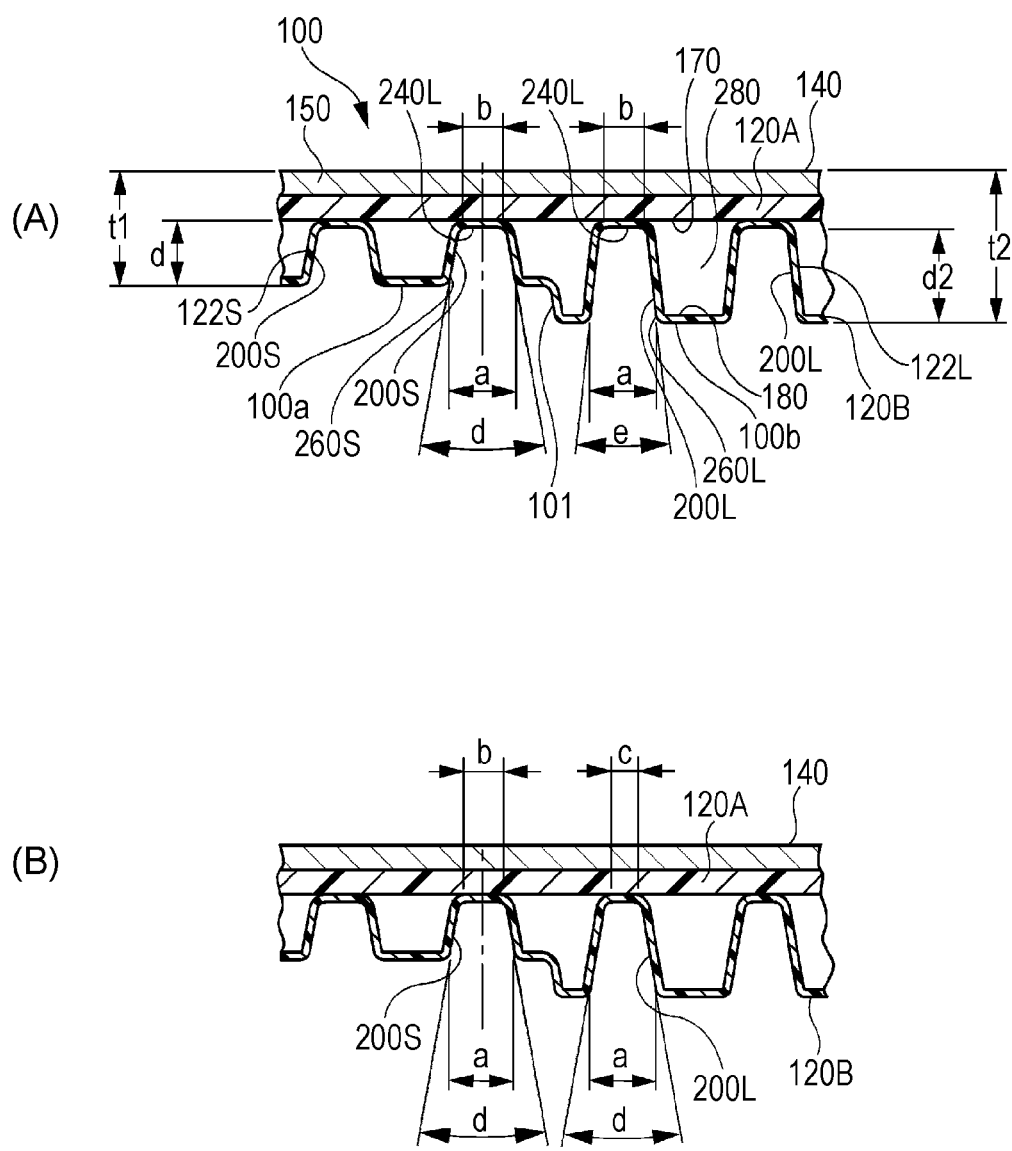
FIG. 16 are diagrams for describing the structure of first and second recesses.

Next, the structure of the first recesses 200S and the second recesses 200L is described in detail with reference to FIG. 15 and FIG. 16. As illustrated in FIG. 15, the first recesses 200S and the second recesses 200L are arranged in a houndstooth pattern at substantially the same pitch P. That the first recesses 200S and the second recesses 200L are arranged at substantially the same pitch means that the distance between the centers of, and the distance between the opening edges of the first recess and the second recess are the same. The pitch may be selected within the range that can prevent the first recess and the second recess from getting closer to each other, resulting in that the sheet is extended in the formation to produce a portion being thinner than the other portion. The difference in distance (pitch) between the first recesses and between the second recesses is necessary to be less than the half length of the opening diameter "a" of the first recess and the second recess. The thickness of the sheet in each portion is preferably in the range of 80 to 120%.

As illustrated in FIG. 16(A), the thin-plate part 100*a* and the thick-plate part 100*b* are connected via a step 101 provided for the backside sheet 120B. The first recesses 200S and the second recesses 200L are welded to the inner surface 170 of the front-side sheet 120A, which is the surface opposite to the outer surface 150 of the front-side sheet 120A to which the decorative material sheet 140 is welded. The depth d1 of the first recess 200S and the depth d2 of the second recess 200L correspond to the difference between the thickness t1 of the thin-plate part 100*a* and the thickness t2 of the thick-plate part 100*b*. The first recess 200S and the second recess 200L constitute a first rib 122S and a second rib 122L, respectively, that connect between the inner surface 180 of the backside sheet 120B and the inner surface 170 of the front-side sheet 120A. Each of the first recesses 200S and the second recesses 200L has a truncated conical shape. In other words, each of the first recesses 200S and the second recesses 200L has an extending shape from the bottom 240S and the bottom 240L toward the opening 260S and the opening 260L, respectively.

The bottom 240S and the bottom 240L are welded to the inner surface 170 of the front-side sheet 120A. Between the front-side sheet 120A and the backside sheet 120B, a hollow part 280 is formed. This hollow part 280 is closed at the peripheral end surface of the laminate structure board 100. The number of the first recesses 200S and the second recesses 200L may be set as appropriate depending on the intended purpose of the resin-laminated board 100. As the number of the recesses is larger, the stiffness can be increased in proportion to the weight.

The diameter of the opening of the first recesses 200S and the second recesses 200L is set to be substantially the same size a. Moreover, the tilt angle "d" of the first recess 200S and the tilt angle "e" of the second recess 200L are adjusted (specifically, tilt angle "d">tilt angle "e"). Thus, in a state that the bottom diameter of the first recess 200S and the bottom diameter of the second recess 200L are set to the same size b, the first recesses 200S and the second recesses 200L can be provided at the same pitch (arrangement intervals).

In this manner, in a state that the diameters of the openings and the bottoms of the first recesses 200S and the second recesses 200L are set to be the same, the first recesses 200S and the second recesses 200L are arranged homogenously. As a result, the stiffness of the resin-laminated board 100 can be homogenized. Thus, the workability of the mold and the moldability of the thick-plate part 100*b* can be increased.

Moreover, the first recesses 200S and the second recesses 200L are arranged at the same pitch. Therefore, as illustrated in FIG. 16(B), it is possible to set the opening diameters "a" and the tilt angles "d" to be the same and to adjust the bottom diameters "c" (specifically, bottom diameter "b">bottom diameter "c"). In this manner, in a state that the opening diameters and the tilt angles of the first recesses 200S and the second recesses 200L are set to be the same, the first recesses 200S and the second recesses 200L are disposed homogeneously. Then, the stiffness of the resin-laminated board 100 can be homogenized. Thus, the workability of the mold and the moldability of the thick-plate part 100*b* can be increased.

Next, the materials of the sheets are specifically described. The sheet material used for the front-side sheet 120A and the backside sheet 120B is an olefin-based resin such as polyethylene or polypropylene, an amorphous resin, or the like. More specifically, sheet materials P1 and P2 are preferably the resin material with high melting tension from the viewpoint of preventing the variation in thickness caused by drawdown or neck-in. On the other hand, the sheet materials P1 and P2 are preferably the resin material with high fluidity in order to improve the transcription and following performance into the mold.

More specifically, the sheet material is polyolefin as a homopolymer or a copolymer of olefins such as ethylene, propylene, butene, isoprene pentene, or methyl pentene (for example, polypropylene or high-density polyethylene). In this polyolefin, the MFR at 230° C. (measured at a temperature of 230° C. with a load of 2.16 kg based on JISK-7210) is less than or equal to 3.0 g per 10 minutes, more preferably in the range of 0.3 to 1.5 g per 10 minutes. Alternatively, the sheet material is an amorphous resin such as acrylonitrile-butadiene-styrene copolymer, polystyrene, high impact polystyrene (HIPS resin), or acrylonitrile-styrene copolymer (AS resin). On this occasion, the amorphous resin has an MRF of 3.0 to 60 g per 10 minutes, and preferably 30 to 50 g per 10 minutes at 200° C. (measured at 200° C. with a test load of 2.16 kg based on JISK-7210). The amorphous resin has a melting tension at 230° C. of 50 mN or more, preferably 120 mN or more. The melting tension is the tension when a strand is extruded from an orifice with a diameter of 2.095 mm and a length of 8 mm at an extrusion speed of 5.7 mm/m and a remaining heat temperature of 230° C. using a melt tension tester. The melt tension tester is manufactured by TOYO SEIKI SEISAKU-SHO, LTD. The strand is wound around a roller with a diameter of 50 mm at a winding speed of 100 rpm.

In order to prevent the crack due to the impact, a hydrogen-added styrene based thermoplastic elastomer is preferably added to the sheet material by less than 30 wt %, preferably less than 15 wt %. Specifically, as the hydrogen-added styrene based thermoplastic elastomer, a styrene-ethylene-butylene-styrene block copolymer, a styrene-ethylene-propylene-styrene block copolymer, a hydrogenated styrene-butadiene rubber, and a mixture thereof are preferable. The elastomer which contains styrene by less than 30 wt %, preferably less than 20 wt %, and whose MFR at 230° C. (measured based on JISK-7210 at a temperature of 230° C. with a test load of 2.16 kg) ranges from 1.0 to 10 g per 10 minutes, preferably 1.0 or more and 5.0 or less g per 10 minutes, is desirable. The sheet materials P1 and P2 may further include an additive. Examples of the additive include inorganic filler such as silica, mica, talc, calcium carbonate, glass fiber, or carbon fiber, plasticizer, stabilizer, colorant, anti-static agent, retardant, and foaming agent. Specifically, silica, mica, glass fiber, or the like is added to the molded resin by 50 wt % or less, preferably 30 to 40 wt %.

The decorative material sheet 140 is formed on the surface of the sheet material as the material of the front-side sheet. In this case, the decorative material sheet 140 is structured for the purposes of: improving the appearance and the decorativeness; and protecting an object being in contact with the molded product (such as, in the case of the cargo floorboard, baggage disposed on the board). As the material of the decorative material sheet 140, a fibrous skin material, a sheet-like skin material, a film-like skin material, or the like is used. Examples of the fibrous skin material include synthetic fiber such as polyester, polypropylene, polyamide, polyurethane, acrylic, or vinylon, semi-synthetic fiber such as acetate or rayon, regenerated fiber such as viscose rayon or copper ammonia rayon, natural fiber such as cotton, hemp, wool, or silk, and fiber in which any of these is blended.

Above all, from the viewpoint of texture, durability, and moldability, the decorative material sheet 140 is preferably polypropylene or polyester, and more preferably polyester. The strand used for the fibrous skin material is preferably a combination of polyesters. Here, the polyesters are polyester: a staple yarn with a fiber length of approximately 2 to 5 inches and a fineness of 3 to 15 deniers of (3 to 5) deniers×(50 to 100) mm, and polyester: a multi-filament of polyester having narrow and soft filaments as a bunch: approximately 150 to 1000 deniers/30 to 200 filaments=approximately 5 deniers×30 to 200 yarns; or a thick mono-filament of polyester: 400 to 800 deniers/1 filament.

For the decorative material sheet 140, a nonwoven fabric, a woven fabric, or a knitted fabric, or a cloth in which the nap of any of these is raised can be used, for example. The woven fabric includes a flatly braided fabric in which warps and wefts are vertically entangled sequentially and a variously changing fabric in which stands are entangled across several strands. Above all, the nonwoven fabric is preferable because the nonwoven fabric has no directionality with respect to the stretch, so that the nonwoven fabric can be formed easily into a three-dimensional shape and has excellent touch and texture. The nonwoven fabric herein means a fabric product structured in a manner that a web is formed by stacking fibers in parallel or alternately or by randomly dispersing the fibers and the fibers formed into the web are bonded. In particular, the nonwoven fabric is preferably the nonwoven fabric manufactured by a needle punch method from the viewpoint of the appearance characteristic and the repeatability of the three-dimensional shape of the finished product. The nonwoven fabric obtained by the needle punch method has lower strength than the woven fabric and is highly stretchable, so that the nonwoven fabric can largely change in any direction. Preferably, a binder is attached to the woven fabric or the web and the nonwoven fabric are layered and punched altogether with a needle in order to improve the strength as the nonwoven fabric and stabilize the size of the fabric. Thus, the decorative material sheet 140 is preferably a polypropylene nonwoven fabric or a polyester nonwoven fabric. In this case, the decorative material sheet 140 is thermoplastic. After the sheet is separated and collected, the sheet can be recycled in other purposes by being thermally deformed. For example, the main resin layer may be formed of polypropylene and the decorative material sheet 140 may be formed of a polypropylene nonwoven fabric. In this case, since the main resin layer and the decorative material sheet 140 of the finished product are formed of the same material, the recycle is facilitated.

Meanwhile, if the decorative material sheet 140 is formed of a polyester nonwoven fabric, the decorative material sheet 140 has a different melting point from the fibrous skin material and the main resin layer formed of polypropylene. Therefore, when the decorative material sheet 140 is attached to the finished product, it is possible to suppress the problem that the thermal change in quality or shape occurs or that the attachment to the right position is failed. In this case, moreover, the moldability, the stiffness, the appearance, and the durability are also excellent. From the viewpoint of the moldability and the repeatability of the three-dimensional shape, the tensile strength of the decorative material sheet 140 is preferably 15 kg/cm$^2$ or more, and the elasticity is preferably 30% or more. Note that the values of the tensile strength and the elasticity are the values measured based on JIS-K-7113 at a temperature of 20° C. For the sheet-like skin material or the film-like skin material, a thermoplastic elastomer, an embossed resin layer, a resin layer with a print layer attached to an outer surface, a synthetic skin, a slipping-prevention mesh-like skin layer, or the like can be used.

The resin-laminated board 100 with the above structure is manufactured by a manufacturing method as below. First, two sheet materials including thermoplastic resin corresponding to the front-side sheet 120A and the backside sheet 120B are disposed in a molten state between a pair of split molds. Next, one sheet material is recessed toward the other sheet material with a plurality of protrusions of one split mold. Thus, the plural first recesses 200S and the plural second recesses 200L are formed. Next, the pair of split molds is clamped. Thus, the bottoms 240S of the plural first recesses 200S and the bottoms 240L of the second recesses 200L are welded to the other sheet material and the two sheet materials are connected with the first ribs 122S and the second ribs 122L, thereby providing the resin-laminated board 100 with a hollow structure.

An effect of the resin-laminated board 100 described above is explained. It is assumed that the resin-laminated board has uniform thickness. When a deflection load is applied to the supported resin-laminated board, the resin-laminated board is deformed according to this load. In general, in order to suppress the amount of deflection without changing the material or the shape, the thickness of the resin-laminated board is increased. If the resin-laminated board has uniform thickness, the increase in thickness necessarily leads to the increase in mass of the resin-laminated board.

In this point, the resin-laminated board 100 includes the thin-plate part 100a and the thick-plate part 100b that is thicker than the thin-plate part 100a. For example, in the case of using the resin-laminated board 100 as the structure in which the both ends of the backside sheet 120B are supported and the central part of the decorative material sheet 140 receives the deflection load, the thick-plate part 100b in the wide region on the central side increases the stiffness, thereby suppressing the amount of deflection. As a result, it is possible to increase the stiffness of the resin-laminated board 100 reasonably without increasing the mass.

Additionally, the first recesses 200S and the second recesses 200L are arranged at substantially the same pitch P; therefore, the stiffness of the resin-laminated board 100 can be homogenized. At the same time, the workability and the moldability of mold can be increased and the appearance is also improved.

In the range for securing the necessary strength, each of the front-side sheet 120A and the backside sheet 120B can be maximally reduced in thickness, thereby attaining reductions in weight and thickness. Thus, the stiffness of the resin-laminated board 100 can be improved further while the weight and thickness reduction is secured.

Next, a region of the resin-laminated board that is suitable for forming the thick-plate part 100b is examined. For this purpose, also in the third example, the analysis model is set for each of the other examples described below and the analysis by CAE (Computer Aided Engineering) is performed. The details are described below.

Analysis Example

Analysis software used: CATIAVSGPS GAS module (linear analysis)
Analysis condition: the analysis condition is described with reference to FIG. 6
Basic model: as illustrated in FIG. 17(A), the basic model M used in the analysis corresponds to the mode in which the front-side sheet (reference symbol 120A in FIG. 1) is welded to the backside sheet (reference symbol 120B in FIG. 1). The basic model M is rectangular, and has a length W of 288 mm on a long side and a length L of 208 mm on a short side. The analysis was performed with a model with a size of ¼ of this basic model M in consideration of the symmetrical shape.
Load Condition
As illustrated in FIG. 17(B), the top surface of the basic model M corresponds to the outer surface of the front-side sheet (reference symbol 150 of FIG. 5A). A load F was applied to the center of this top surface. The surface receiving the load F was the circular surface with a diameter of D. The load F was 196 N, the diameter D was 60 mm, and the thickness t was 7 mm homogeneously.
Constraint Condition
The constraint parts R and R for supporting the end parts of the basic model M on the short side were set, and the width W1 of this constraint part R was set to 24 mm.
Material Condition As the material of the model, the material in which talc was added to polypropylene was assumed. The modulus of elasticity was set to 825 MPa, the Poisson's ratio was set to 0.45, and the density was set to 1.0 g/cm$^3$.
Analysis Models M1 to M4
In contrast to the basic model M with the thickness t homogenized, the analysis models M1 to M4 having the thin-plate part and the thick-plate part are set. The thickness of the thick-plate part is set to 10 mm in the analysis models M1 to M4. The mass of each of the analysis models M1 to M4 is set to be the same as the mass of the basic model by adjusting the thickness of each sheet.

Figure 18:
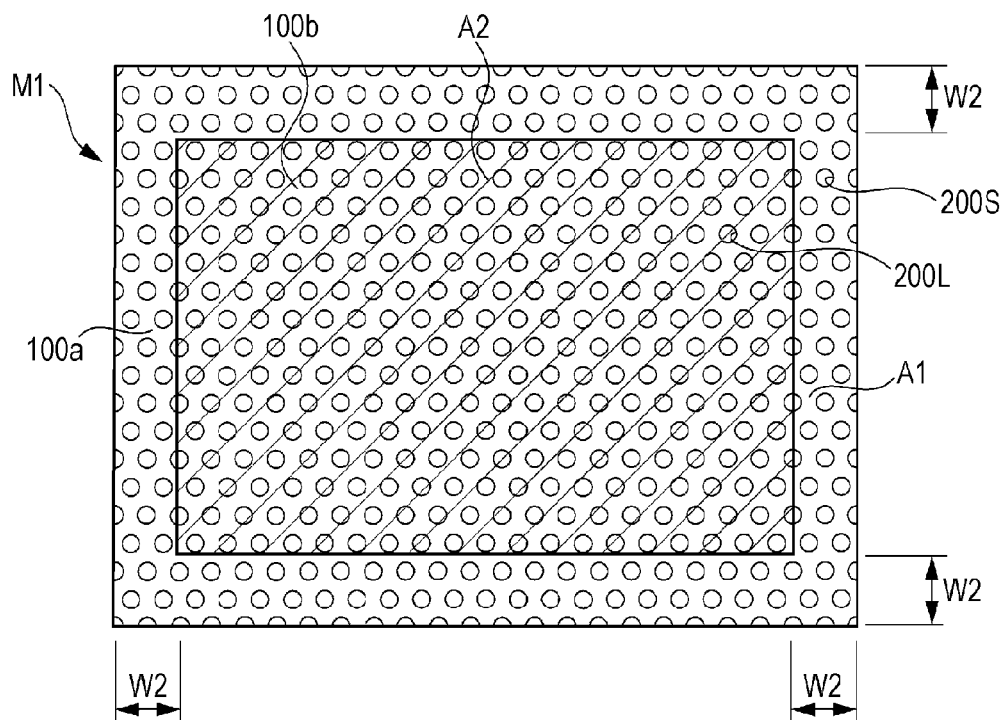
FIG. 18 is a bottom view of a first analysis model.
Figure 19:
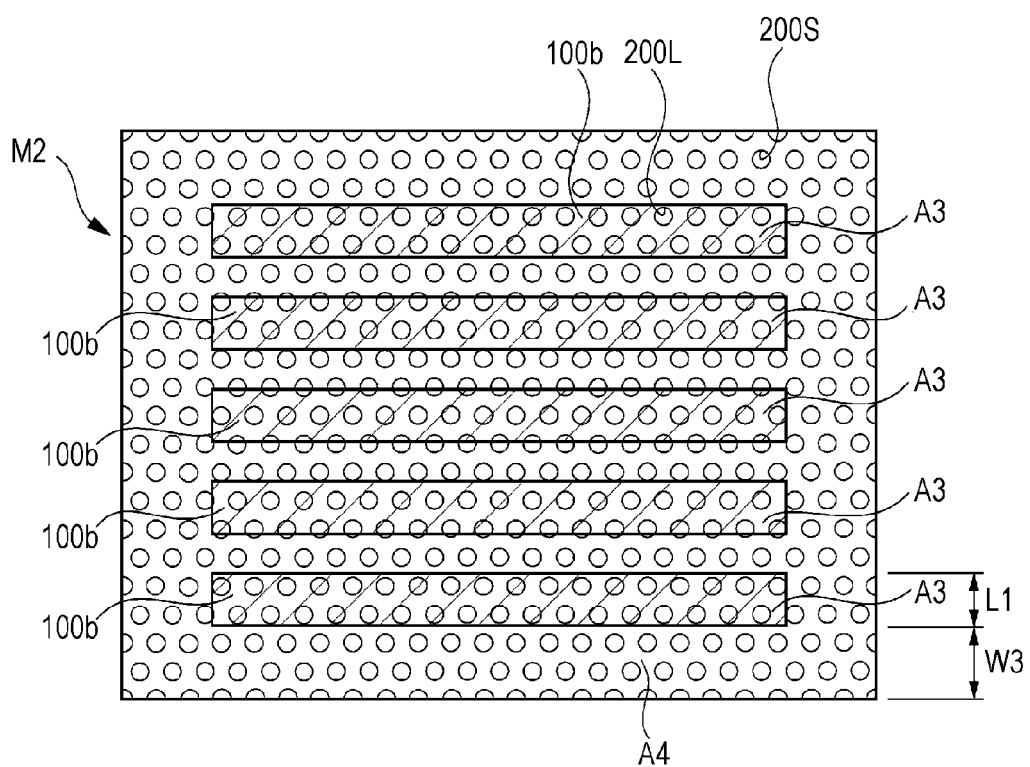
FIG. 19 is a bottom view of a second analysis model.
Figure 20:
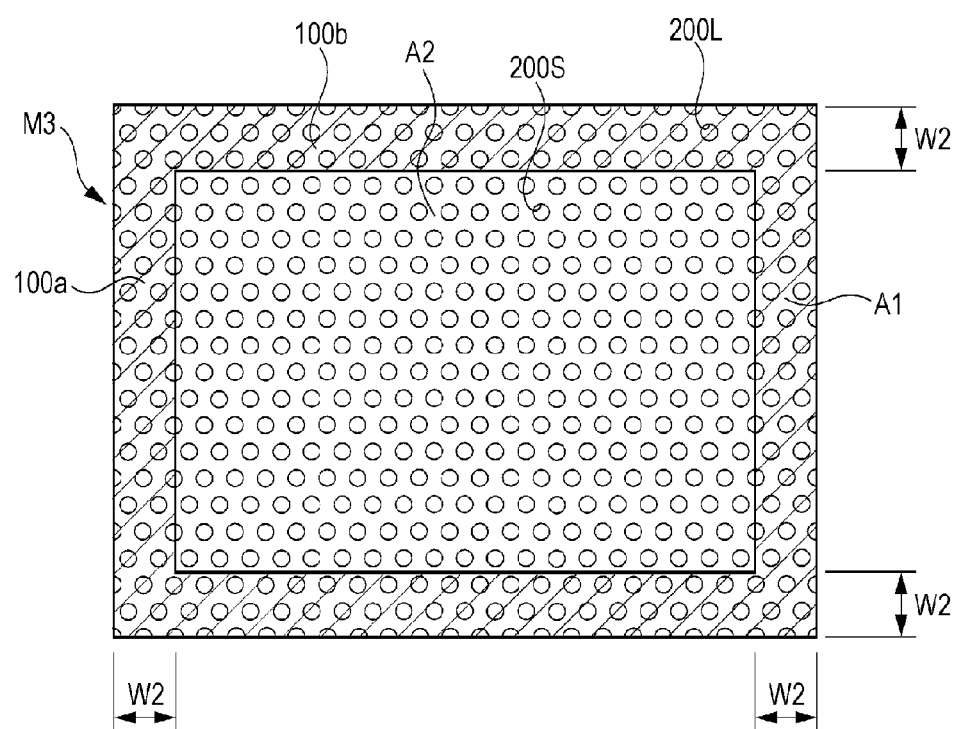
FIG. 20 is a bottom view of a third analysis model.
Figure 21:
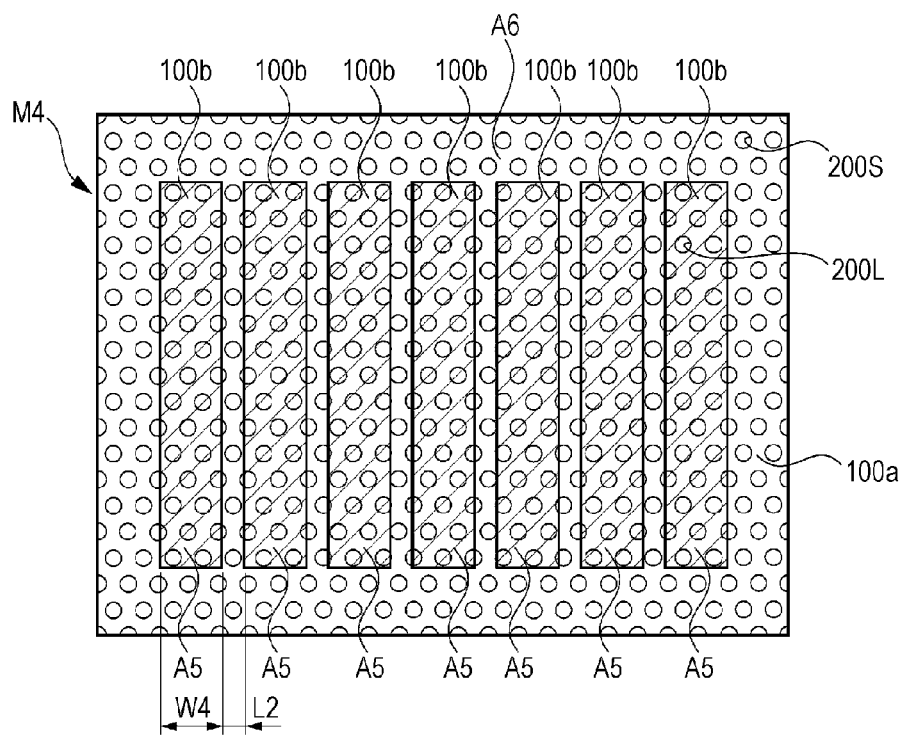
FIG. 21 is a bottom view of a fourth analysis model.

Each analysis model is described with reference to FIG. 18 to FIG. 21. In each drawing, the portion illustrated with the oblique lines is the region of the thick-plate part.
Analysis Model M1
As illustrated in FIG. 18, in the analysis model M1, a region A1 formed to have a width of W2 along four sides of the rectangle in the basic model M was set as the thin-plate part 100a. A region A2 surrounded by this thin-plate part 100b was set as the thick-plate part 100b. The width W2 was set to 29 mm and the thick-plate part 100b was formed on the central side as compared with the constraint part (reference symbol R in FIG. 17). The thickness of the thin-plate part 100a was set to 7 mm, and the thickness of the thick-plate part 100b was set to 10 mm. The analysis model M1 corresponds to the resin-laminated board 100 of the third example.
Analysis Model 2
As illustrated in FIG. 19, the analysis model M2 corresponds to another example of the present invention. In the basic model M, regions A3 extending in a band-like shape connecting between the two constraint parts (reference symbol R in FIG. 17) were provided. Five lines of the band-like regions A3 were provided in a direction orthogonal to the direction where the region A3 extends. The regions A3 in five lines were formed as the thick-plate parts 100b. The other region A4 was formed as the thin-plate part 100a. The width W3 of each of the regions A3 is 20 mm, and the distance L1 between the regions A3 is 12.5 mm. The regions A3 in five lines correspond to the mode where the region A2 of the analysis model M1 is divided into five. In this analysis model M2, the thick-plate part 100b is also formed on the central side as compared with the constraint part (reference symbol R in FIG. 16). The thickness of the thin-plate part 100a was set to 7 mm, and the thickness of the thick-plate part 100b was set to 10 mm.
Analysis Model M3
As illustrated in FIG. 20, the analysis model M3 is another example of the present invention. In the basic model M, the region A1 formed with a width of W2 along the four sides of the rectangle was used as the thick-plate part 100b. The region A2 surrounded by this thick-plate part 100b was used as the thin-plate part 100a. The width W2 was set to 29 mm and the thick-plate part 100b was formed on the constraint part (reference symbol R in FIG. 17). The thickness of the thin-plate part 100a was set to 7 mm, and the thickness of the thick-plate part 100b was set to 10 mm.
Analysis Model M4
As illustrated in FIG. 21, the analysis model M4 is another example of the present invention. In the basic model M, regions A5 extending in the band-like shape were provided along (and in parallel to the short side of) the constraint parts (reference symbol R in FIG. 17). Five lines of the band-like regions A5 were provided in a direction orthogonal to the direction where the region A5 extends. The regions A5 in five lines were used as the thick-plate part 100b. The other region A6 was used as the thin-plate part 100a. The width W4 of each of the regions A5 was 20 mm, and the distance L2 between the regions A5 was 15 mm. The regions A5 in five lines correspond to the mode where the region A2 of the analysis model M1 is divided into seven. In this analysis model M2, the thick-plate part 100b is also formed on the central side as compared with the constraint part (reference symbol R in FIG. 17). The thickness of the thin-plate part 100a was set to 7 mm, and the thickness of the thick-plate part 100b was set to 10 mm.

Method

Based on the above analysis conditions, the basic model M and the analysis models M1 to M4 were analyzed and the amount of deflection δ of each was obtained.

Results

The analysis results of the amount of deflection δ of each of the basic model M and the analysis models M1 to M4 are shown in Table 1.

TABLE 1

| Model | Thickness | Amount of deflection δ |
|---|---|---|
| Basic model M (comparative example) | 7 mm homogeneously | 19.8 mm |
| Analysis model M1 | thin-plate part: 7 mm | 13.5 mm |
| Analysis model M2 | thick-plate part: 10 mm | 14.3 mm |
| Analysis model M3 | | 16.6 mm |
| Analysis model M4 | | 25.5 mm |

As indicated in Table 1, the amount of deflection δ was 19.8 mm in the basic model with the thickness t homogenized. In contrast to this, in the analysis model M1, it was confirmed that the amount of deflection δ was 13.5 mm and the deformation was sufficiently suppressed. Therefore, it is effective to form the thick-plate part 100b widely in the central part as the resin-laminated board (reference symbol 100 in FIG. 14) of the analysis model M1.

In the analysis model M2, it was confirmed that the amount of deflection δ was 14.3 mm and the deformation was sufficiently suppressed. Therefore, it is effective to form the plural regions extending in the band-like shape between the both supported ends as the thick-plate part as in the analysis model M2.

In the analysis model M3, it was confirmed that the amount of deflection δ was 16.6 mm and the deformation was sufficiently suppressed. Therefore, it is effective to form the region including the supported both ends and extending along the outer periphery with predetermined width as the thick-plate part as in the analysis model M3.

In the analysis model M4, the amount of deflection δ was 25.5 mm, which was greater than the amount of deflection of the basic model M. The region of the thick-plate part 100b in the analysis model M4 (reference symbol A5 in FIG. 21) extends along the constraint parts (reference symbol R in FIG. 17). On the other hand, in the analysis model M2 similar to this analysis model M4, the region of the thick-plate part 100b (reference symbol A3 in FIG. 19) extends in a direction orthogonal to the constraint parts (reference symbol R in FIG. 17). This produced the favorable results that the deformation was suppressed.

The results from the analysis models M4 and M2 indicate that it is effective to form, in the case where the region of the thick-plate part is in the band-shape and provided in plural lines, the band-like regions extending from one constraint part to the other constraint part.

Thus, even in the analysis model M4, if the long side of the rectangle is constrained, the thick-plate part 100b effectively operates to suppress the amount of deflection.

Note that the modes of the analysis models M2 to M4 were described as the analysis model. It is possible to employ the same structure as the resin-laminated board (reference symbol 100 in FIG. 14) of the analysis model M1 except the region of the thick-plate part. In this case, the effect similar to the effect of the resin-laminated board of the analysis model M1 is obtained.

Although the examples of the present invention have been described in detail, it is possible for a person skilled in the art to variously correct or modify the examples within the range not departing from the content of the present invention. For example, in the examples, the present invention is applied to the interior material for an automobile. However, the present invention is not limited to this, and the present invention can be applied to not just general vehicles such as a railway, an aircraft, or ship but also to a special vehicle such as a vehicle used in an amusement park. In the case of the special vehicle, in particular, the good appearance including the color designed for the children is considered important. Thus, the interior material made of resin is suitable. Further, in the examples, the present invention is described as the interior material with a flat-plate shape. However, the present invention is not limited thereto, and the present invention is applicable to the purpose of, for example, a three-dimensional shape such as a ceiling material or an instrument panel. In this case, it is possible to secure necessary thickness while reducing the weight and maintaining the stiffness enough to maintain the external shape. Further, the thickness of the thick-plate part having the second recesses is preferably larger relative to that of the thin-plate part having the first recesses, and can be set arbitrarily. The thickness of the thick-plate part can be different depending on the portions in the resin-laminated board.

Figure 22:
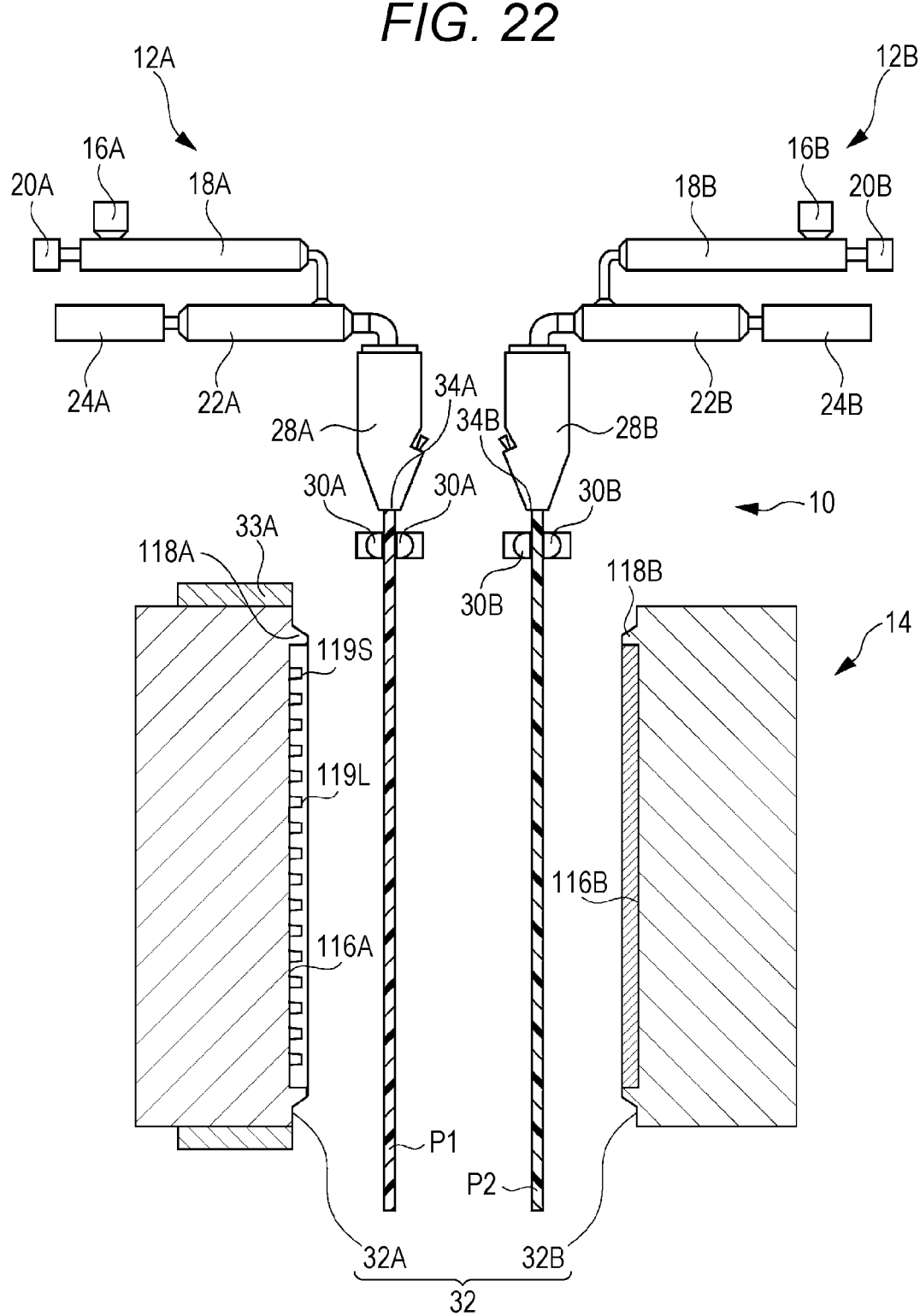
FIG. 22 is a side view of a molding apparatus.

Subsequently, a molding apparatus used for manufacturing the resin-laminated board is described with reference to FIG. 22. As illustrated in FIG. 22, a molding apparatus 10 for the resin-laminated board (reference symbol 100 in FIG. 12) includes extrusion devices 12A and 12B, and a clamping device 14 disposed below the extrusion devices 12A and 12B. The sheet materials P1 and P2 are the molten thermoplastic resin extruded from the extrusion devices 12A and 12B. These sheet materials P1 and P2 are supplied to the clamping device 14, where the molten sheet materials P1 and P2 are molded. Since the extrusion devices 12A and 12B are similar to each other, just the extrusion device 12A for the sheet material P1 is described. The description of the extrusion device 12B for the sheet material P2 is omitted. Each part of the extrusion device 12A is denoted by "A", while each part of the extrusion device 12B is denoted by "B".

The extrusion device 12A is of conventionally known type, and its detailed description is omitted. The extrusion device 12A includes a cylinder 18A, a screw (not shown), a hydraulic motor 20A, an accumulator 22A, and a plunger 24A. The cylinder 18A is provided with a hopper 16A. The screw (not shown) is provided in the cylinder 18A. This screw is connected to the hydraulic motor 20A. The accumulator 22A is internally connected to the cylinder 18A. The plunger 24A is provided in the accumulator 22A. A resin pellet input from the hopper 16A is welded and kneaded by the rotation of the screw by the hydraulic motor 20A in the cylinder 18A. The molten resin is transferred to the accumulator chamber 22A, and a certain amount of the resin is stored therein. Then, the molten resin is supplied toward a T-die 28A by the drive of the plunger 24A. The molten resin is extruded as the continuous sheet material P1 with predetermined length through an extrusion slit 34A. The sheet material P1 is fed downward while the material P1 is pressed between a pair of rollers 30A and 30A disposed at a distance from each other. After that, the sheet material P1 falls between split molds 32A. Thus, as described later, the sheet material P1 is disposed between the split molds 32A and 32B in a state that the sheet material P1 has uniform thickness in a vertical direction (extrusion direction).

The capability of the extrusion of the extrusion device 12A is selected as appropriate from the viewpoint of the size of the resin molded product to be molded and the prevention of the drawdown or the neck-in of the sheet material P1. More specifically, the amount of extrusion of one shot in the intermittent extrusion is preferably 1 to 10 kg from the practical point of view. The extrusion rate of the resin from the extrusion slit 34A is several hundreds of kilograms per hour, preferably 700 kg/h or more. The time of the process of extruding the sheet material P is preferably shorter from the viewpoint of preventing the drawdown of the sheet material P1 or the neck-in. The extrusion rate depends on the kind of the resin, the MFR value, and the melt tension value. In general, the process of extrusion is preferably completed within 40 seconds, more preferably 10 to 20 seconds. Therefore, the amount of extrusion of the thermoplastic resin per unit area and per unit time from the extrusion slit 34 is 50 kg/h/cm$^2$ or more, preferably 150 kg/h/cm$^2$ or more.

By feeding the sheet material P1 held between the pair of rollers 30A and 30A downward, the sheet material P1 can be rolled to be thinned. By adjusting the relation between the extrusion rate of the sheet material P1 to be extruded and the feeding rate of the sheet material P1 by the pair of rollers 30A and 30A, it is possible to prevent the drawdown or the neck-in. This can reduce the restriction on the kind of the resin, especially the MFR value and the melt tension value or the amount of extrusion per unit time.

The extrusion slit 34A provided for the T-die 28A is disposed to face downward in the vertical direction. The sheet material P1 extruded from the extrusion slit 34A is fed downward in the vertical direction in a mode that the sheet material P1 falls from the extrusion slit 34A. When the distance between the extrusion slits 34A is changeable, the thickness of the sheet material P1 can be changed.

The pair of rollers 30A and 30A is described. In the pair of rollers 30A and 30A, the rotation axes are disposed substantially horizontally in parallel to each other below the extrusion slit 34A. One serves as a rotation driving roller, while the other serves as a rotation driven roller. More specifically, the pair of rollers 30A and 30A is disposed in a line-symmetrical manner about the sheet material P1 extruded in a mode of falling down from the extrusion slit 34A.

The diameter of the roller 30A and the axial length of the roller 30A may be determined as appropriate in accordance with the extrusion rate of the sheet material P1 to be molded, the length and width of the sheet material P1 in the extrusion direction, and the kind of the resin, for example. From the viewpoint of feeding the sheet material P1 smoothly downward by the rotation of the rollers 30A and 30A in a state that the sheet material P1 is held between the pair of rollers 30A and 30A, the diameter of the rotation driving roller is preferably slightly larger than the diameter of the rotation driven roller as described later. The diameter of the roller 30A is preferably in the range of 50 to 300 mm. When the radius of curvature of the roller is too large or too small, a trouble may be caused that the sheet material is wound around the roller when the roller and the sheet material P1 are brought into contact with each other. On the other hand, the clamping device 14 is also of conventionally known type, similar to the extrusion device 12; therefore, the detailed description thereof is omitted. The clamping device 14 has a mold driving device. The mold driving device moves a pair of split molds (described later) between an open position and a closed position in a direction that is substantially orthogonal to the direction where the sheet materials P1 and P2 in the molten state are supplied.

The mold 32 is of split type. The mold 32 includes the split mold 32A and the split mold 32B that fits the split mold 32A. The split molds 32A and 32B are disposed with cavities 116A and 116B thereof facing each other. The cavities 116A and 116B are disposed substantially in the vertical direction.

The cavity 116A of the split mold 32A forms the backside sheet (reference symbol 120B in FIG. 12). A surface of the cavity 116A of the split mold 32A is provided with first protrusions 119S and second protrusions 119L that form the first and second recesses (reference symbols 200S and 200L in FIG. 13), respectively. The first protrusions 119S and the second protrusions 119L have the complementary shape to the first and second recesses (reference symbols 200S and 200L in FIG. 13), and protrude toward the cavity 116B of the other split mold 32B.

Figure 23:
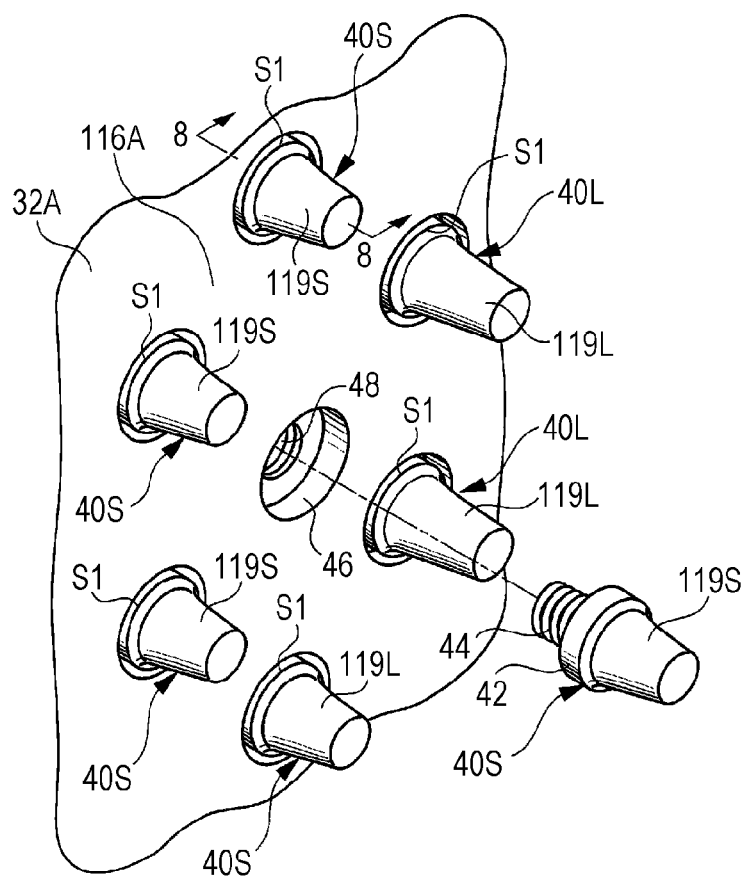
FIG. 23 is a perspective view of first and second piece members according to the present invention.

Here, the structures of the first protrusions 119S and the second protrusions 119L are specifically described with reference to FIG. 23 and FIG. 24. As illustrated in FIG. 23, the first protrusions 119S and the second protrusions 119L are provided for first piece members 40S and second piece members 40L that are components provided separate from the split mold 32A, respectively.

The first piece member 40S has the first protrusion 119S on the end side, an engagement part 42S provided at a base of the first protrusion 119S, and a male screw part 44 provided at a base surface of this engagement part 42. The male screw part 44 is narrower than the engagement part 42. In the second piece member 40L, the engagement part 42 and the male screw part 44 have the similar structure.

On the other hand, the surface of the cavity 116A of the split mold 32A is provided with an engagement hole 46 and a female screw hole 48. The engagement hole 46 has a larger inner diameter than the engagement part 42. The female screw hole 48 is formed at the center of the bottom of this engagement hole 46. The engagement holes 46 and the female screw holes 48 are arranged to correspond to the plural first recesses (reference symbol 200S in FIG. 27) and the plural second recesses (reference symbol 200L in FIG. 27) in the cavity 116A of the split mold 32A.

Figure 24:
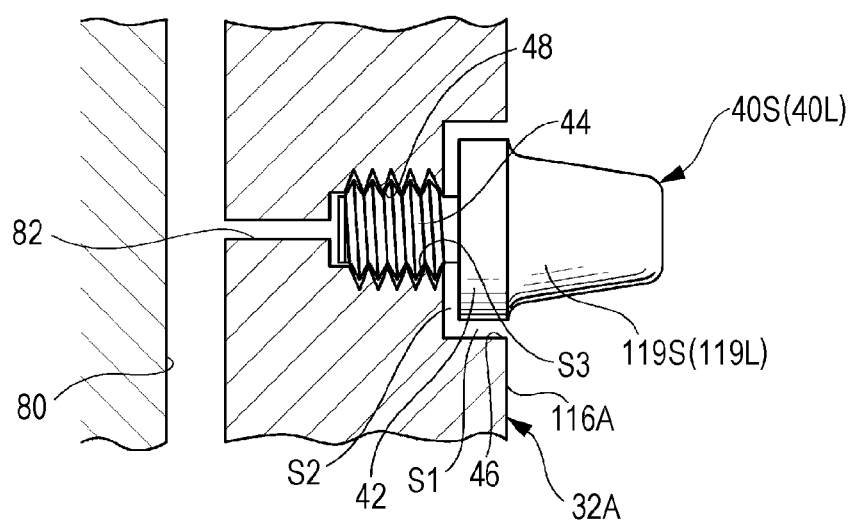
FIG. 24 is a sectional view taken along line 8-8 of FIG. 23.

As illustrated in FIG. 24, the male screw part 44 is screwed into the female screw hole 48, thereby fixing the first piece member 40S and the second piece member 40L into the split mold 32A. In this state, the bases (roots) of the first protrusions 119S and the second protrusions 119L have the equal surface to the cavity 116A. Between the outer peripheral surface of the engagement part 42 and the inner peripheral surface of the engagement hole 46, an annular space S1 is formed. Additionally, a space S2 is formed between the base surface of the engagement part 42 and the bottom of the engagement hole 46. Between the male screw part 44 and the female screw hole 48, a space S3 is formed between the screw thread and the screw root. Inside the split mold 32A, a vacuum suction chamber 80 is provided. This vacuum suction chamber 80 is connected to the bottom of the female screw hole 48 via a vacuum suction hole 82. As a result, the vacuum suction chamber 80 and the cavity 116A are connected via the spaces S1 to S3 and the vacuum suction hole 82.

FIG. 22 is employed again in the description. In the split molds 32A and 32B, pinch off parts 118A and 118B are formed around the cavities 116A and 116B, respectively. In other words, the pinch off parts 118A and 118B are formed to be annular around the cavities 116A and 116B. The pinch off parts 118A and 118B protrude toward the split molds 32A and 32B facing each other. Thus, when the split molds 32A and 32B are clamped, the ends of the pinch off parts 118 and 118B are brought into contact with each other. As a result, the two sheet materials P1 and P2 are welded so that a parting line is formed at the periphery, and thus the outer peripheral wall covering the hollow part (reference symbol 280 in FIG. 30) is formed.

To the outer peripheral part of the split mold 32A, a frame 33A is externally fitted in a slidable manner in a sealed state. With a frame moving device, which is not shown, the frame 33A is movable relative to the split mold 32A. More specifically, the frame 33A protrudes toward the split mold 32B. Thus, the frame 33A can be abutted on the side surface of the sheet material P1 disposed between the split mold 32A and the split mold 32B.

The mold driving device is similar to the conventional one, and the description thereof is omitted. The split molds 32A and 32B are driven by the mold driving devices. At an open position, the two sheet materials P1 and P2 are disposed between the split molds 32A and 32B. At a closed position, the pinch off parts 118A and 118B of the split molds 32A and 32B are brought into contact with each other. This forms the sealed space between the split molds 32A and 32B. The movement of the split molds 32A and 32B from the open position to the closed position is described. When the split molds 32A and 32B are in the closed position (i.e., the position of the split molds 32A and 32B where the pinch off parts 118A and 118B are in contact with each other), the split molds 32A and 32B are at the equal distances from the both sheet materials P1 and P2 between the sheet materials P1 and P2. The split molds 32A and 32B are driven by the mold driving device, and are moved toward that position. Note that the extrusion device for the sheet material P1 and the pair of rollers 30A and 30A and the extrusion device for the sheet material P2 and the pair of rollers 30B and 30B are disposed in a symmetrical manner about this closed position.

Meanwhile, the sealed space is formed by the both molds when the split molds 32A and 32B are clamped. The split mold 32B is provided with a conventional blow pin (not shown) so that a blowing pressure can be applied from the sealed space.

A method of manufacturing the resin-laminated board using the aforementioned molding apparatus and various sheets is described with reference to FIG. 22 and FIG. 25 to FIG. 29. First, in FIG. 22, a predetermined amount of the thermoplastic resin that has been molten and kneaded is stored in the accumulators 22A and 22B. The stored thermoplastic resin is intermittently extruded by a predetermined amount per unit time from the extrusion slits 34A and 34B provided for the T-dies 28A and 28A at a predetermined distance therebetween. Thus, the thermoplastic resin is extruded at a predetermined extrusion rate in predetermined thickness to swell and fall down in a molten sheet shape.

Next, the rollers 30A and 30B are moved to the open position. Next, the distance between the pair of rollers 30A and 30B disposed below the extrusion slits 34A and 34B is increased to be greater than the thickness of the sheet materials P1 and P2. Thus, the lowermost part of the sheet materials P1 and P2 in the molten state extruded downward is supplied smoothly to the rollers 30A and 30B. Note that the timing for increasing the distance between the pair of rollers 30A and 30A and the rollers 30B and 30B to be greater than the thickness of the sheet materials P1 and P2 is not necessarily after the start of the extrusion but may be after the end of the secondary molding for each shot. Next, the pair of rollers 30A and 30A and the pair of rollers 30B and 30B are brought closer to each other and moved to the closed position, thereby having the sheet materials P1 and P2 interposed therebetween. Subsequently, the sheet materials P1 and P2 are fed downward by the rotation of the rollers 30A and 30B.

Next, the sheet materials P1 and P2 having uniform thickness in the extrusion direction are disposed between the split molds 32A and 32B disposed below the rollers 30A and 30B. Thus, the sheet materials P1 and P2 are positioned in a mode of protruding beyond the pinch off parts 118A and 118B. In this manner, the sheet material P2 as the material for the front-side sheet (reference symbol 120A in FIG. 12) and the sheet material P1 as the material for the back-side sheet (reference symbol 120B in FIG. 12) are disposed between the split molds 32A and 32B in a state of being separated from each other. In this case, the thickness of the sheet materials P1 and P2 to be disposed between the split molds 32A and 32B can be adjusted by individually adjusting the distance between the extrusion slits 34A and 34B or the rotation rate of the rollers 30A and 30B.

More specifically, the sheet material P1 as the material for the backside sheet is provided with the first and second recesses (reference symbols 200S and 200L in FIG. 13). Thus, the sheet material P1 is extended along the first protrusions 119S and the second protrusions 119L at the molding. The sheet material P1 tends to be formed thinner than the sheet material P2 as the material for the front-side sheet not provided with the recesses. By clamping the split molds 32A and 32B as described later, the backside sheet and the front-side sheet are welded to each other to complete the resin-laminated board (reference symbol 100 in FIG. 12). On this occasion, for example, the distance between the extrusion slits 34A is increased to be larger than the distance between the extrusion slits 34B so that the thickness of the backside sheet is almost equal to that of the front-side sheet. This can make the sheet material P1 thicker.

Figure 25:
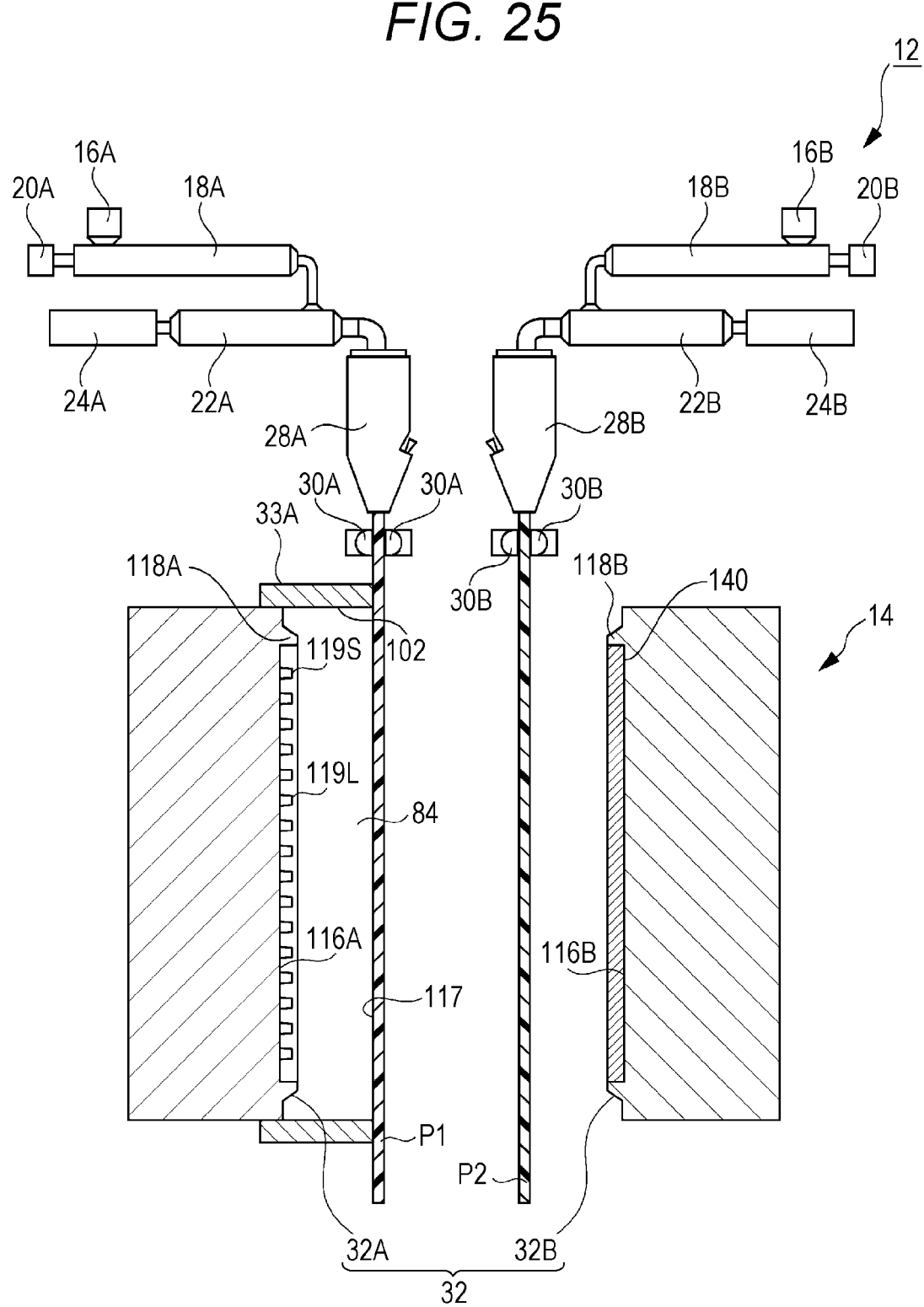
FIG. 25 is a diagram illustrating the operation of the mold frame of the split molds.

Next, as illustrated in FIG. 25, the frame 33A is moved from the split mold 32A until the frame 33A is brought into contact with the outer surface 117 of the sheet material P1. Note that the decorative material sheet 140 may be held above the mold as appropriate and caused to fall in advance along the cavity surface. The timing of disposing this decorative material sheet 140 may be before the clamping of the mold 32.

Figure 26:
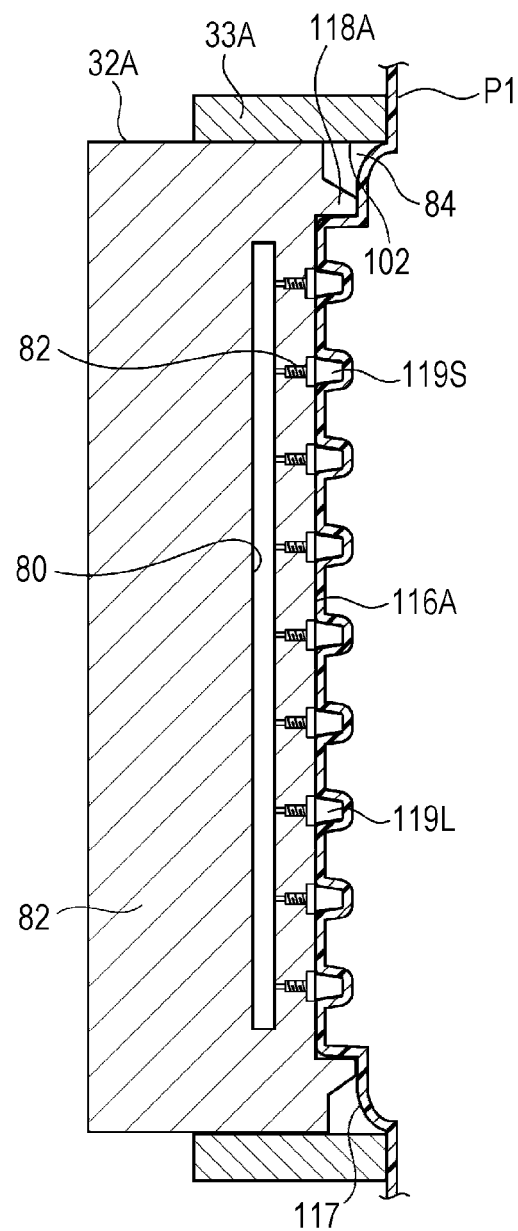
FIG. 26 is a diagram illustrating the state of shaping a sheet material.

Next, as illustrated in FIG. 26, a first sealed space 84 is formed by the cavity 116A of the split mold 32A, the inner peripheral surface 102 of the frame 33A, and the outer surface 117 of the sheet material P1 facing the split mold 32A. The first sealed space 84 is evacuated to vacuum using the vacuum suction chamber 80 and the vacuum suction hole 82. Thus, the sheet material P1 is pressed against the cavity 116A.

Figure 27:
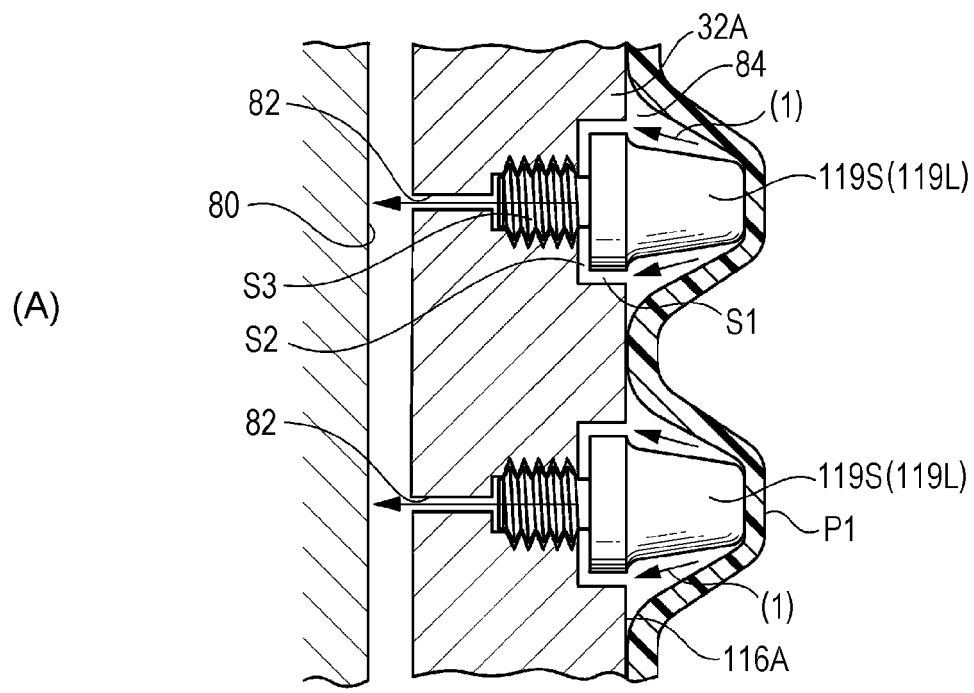
FIG. 27 are diagrams for describing the operation of the first and second piece members.
Figure 27:
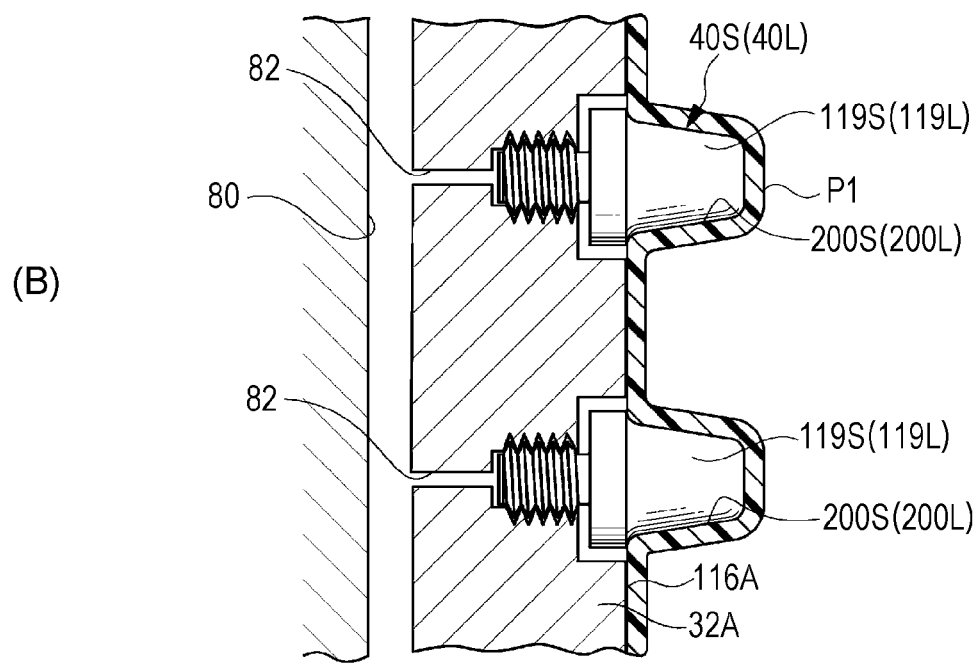

Here, the operation of the spaces S1 to S3 is described based on FIG. 27. As illustrated in FIG. 27(A), at the vacuum suction, the first sealed space 84 is evacuated through the vacuum suction chamber 80, the vacuum suction hole 82, and the spaces S1 to S3. On this occasion, the air around the base of the first protrusions 119S and the second protrusions 119L is sucked through the space S1 and removed smoothly (arrow (1)). Thus, as illustrated in FIG. 27(B), the sheet material P1 is shaped around the base of the first protrusions 119S and the second protrusions 119L and between the adjacent first protrusions 119S or between the second protrusions 119L. As a result, the fold can be prevented.

Figure 28:
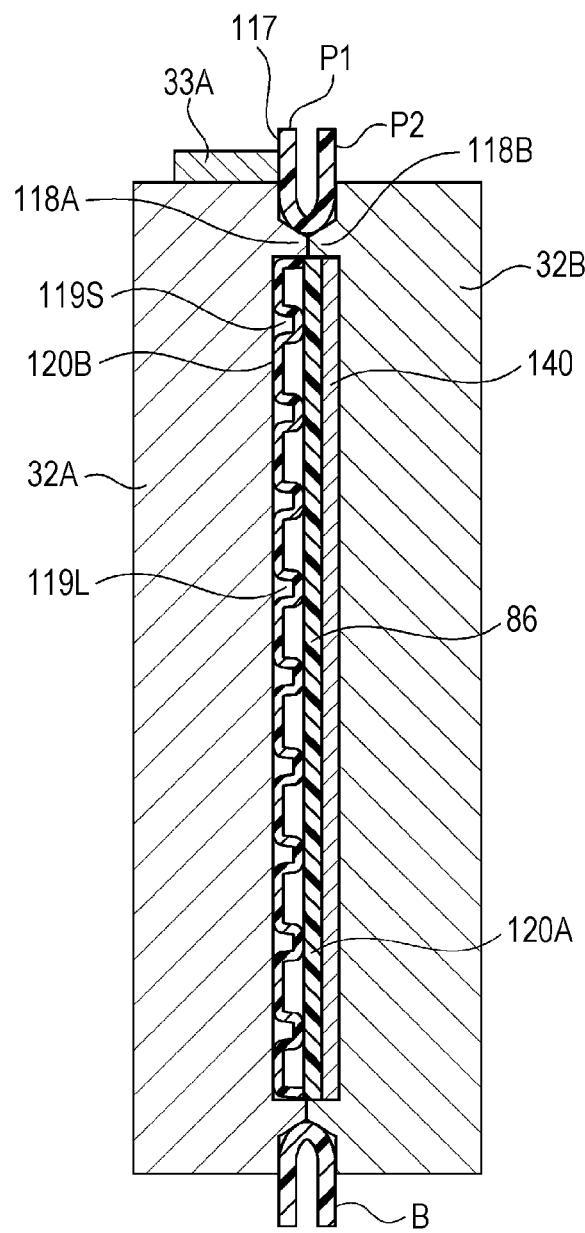
FIG. 28 is a diagram illustrating a state in which the split molds are clamped.

Next, as illustrated in FIG. 28, the sheet material P1 is sucked and held in a state that the frame 33A in contact with the outer surface 117 of the sheet material P1 is maintained at the same position. Further, the split molds 32A and 32B are moved to get closer to each other until their annular pinch off parts 118A and 118B are brought into contact with each other. In this case, the position where the pinch off parts 118A and 118B are in contact with each other in a clamping direction is between the sheet materials P1 and P2 that are separated from each other. This brings the pinch off parts 118A and 118B into contact with each other. As a result, the peripheries of the sheet materials P1 and P2 are welded and fixed to each other.

Figure 29:
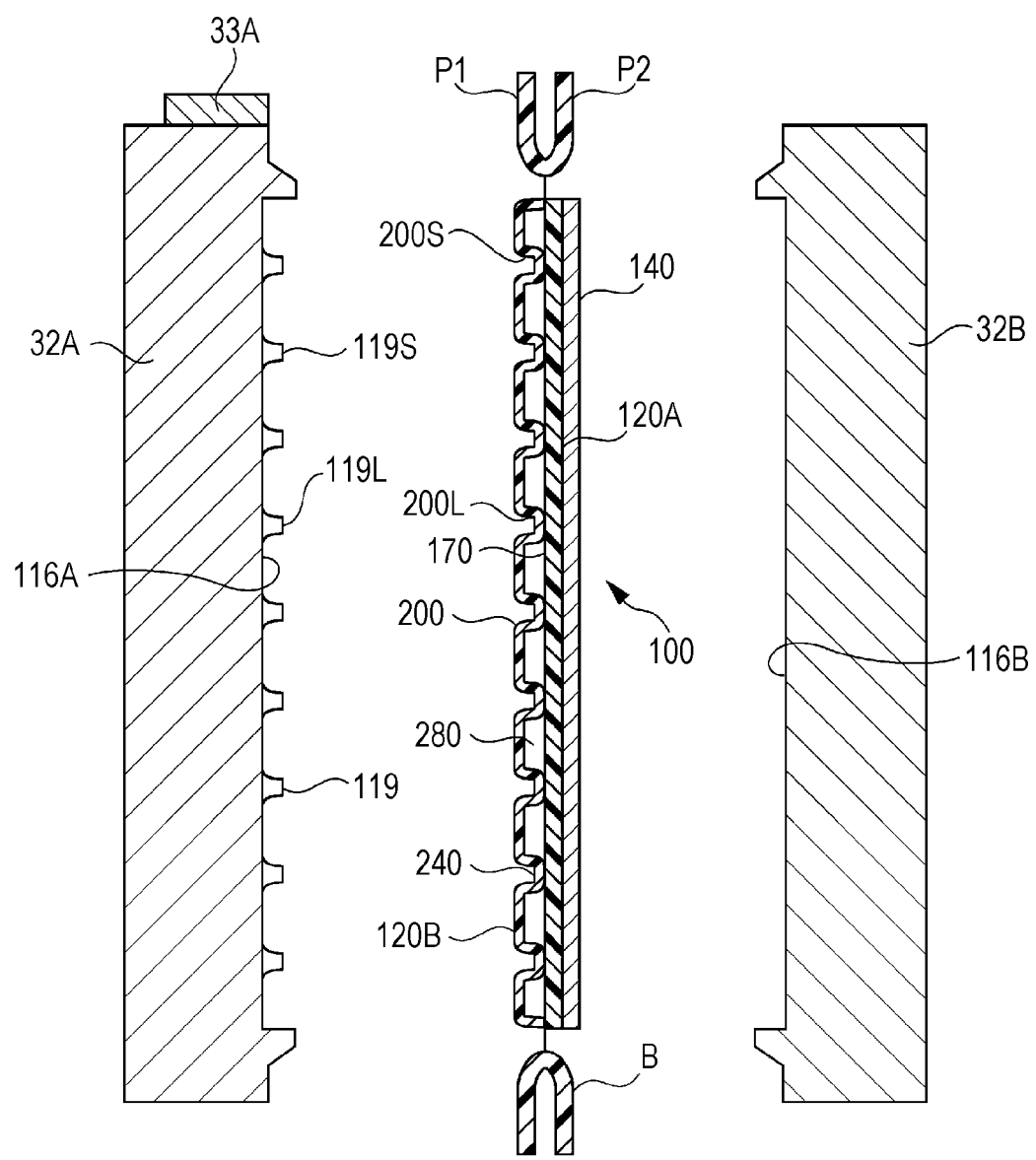
FIG. 29 is a diagram illustrating a state in which the split molds are opened.

Then, as illustrated in FIG. 29, the split molds 32A and 32B are separated and the resin-laminated board 100 is extracted. Next, a burr part B outside the pinch off parts 118A and 118B are cut off, thereby forming a molded product.

In the obtained resin-laminated board 100, the first and second recesses 200S and 200L are formed on the surface of the backside sheet 120B by the clamping of the split molds 32A and 32B. The bottoms (reference symbols 240S and 240L in FIG. 13) of the first and second recesses 200S and 200L are welded to the inner surface 170 of the front-side sheet 120A. Thus, the sealed hollow space 280 is formed between the backside sheet 120B and the front-side sheet 120A.

By repeating the above steps every time the molten sheet materials P1 and P2 are intermittently extruded as described above, the sheet-like resin-laminated boards 100 can be formed sequentially. Moreover, by intermittently extruding the thermoplastic resin as the molten sheet materials P1 and P2 through extrusion molding and by vacuum molding or pressure molding, the extruded sheet materials P1 and P2 can be formed into a predetermined shape using the mold.

According to the technique of manufacturing the resin-laminated board 100 as described above, the following effects can be obtained. As illustrated in FIG. 27, the sheet material P1 is formed along the external shape of the cavity 116A, the first protrusions 119S or the second protrusions 119L by the spaces S1 to S3. Therefore, the fold can be prevented. In particular, the moldability of the second recesses 200L, whose molding is difficult due to the large depth, is improved to increase the quality of the resin-laminated board in mass production.

Moreover, the first piece member 40S and the second piece member 40L having the first protrusion 119S and the second protrusion 119L are separate components from the split mold 32A. Therefore, the shapes of the first protrusion 119S and the second protrusion 119L are not restricted in the process by the split mold 32A. Therefore, the shapes of the first protrusions 119S and the second protrusions 119L can be freely designed to be conical, columnar, prism, pyramidal, hemispherical, or other various shapes in accordance with the quality required for the resin-laminated board.

Depending on the quality required for the material of the resin-laminated board, it is necessary to process the protrusions into a body of rotation, such as a columnar or truncated conical shape. On the other hand, the split mold is processed by cutting. When processing the split mold, it is difficult to process a portion of the mold into a shape of body of rotation.

In this point, in this example, the piece member as a separate component from the split mold 32A is provided with the first protrusion 119S and the second protrusion 119L. Therefore, the first protrusion 119S and the second protrusions 119L can be easily processed into the shape of a body of rotation.

In this example, within the range of securing the necessary strength, the two sheet materials P1 and P2 can be maximally reduced in thickness, respectively. Thus, the resulting sheets can sufficiently reduce their weights and thicknesses while securing their fabrication efficiencies and the product qualities.

The manufacturing method for the resin-laminated board according to the present invention has been described in detail. However, it is possible for a person skilled in the art to variously correct or modify the method within the range not departing from the scope of the present invention. For example, in this example, the shape is formed by the suction before the clamping of the split molds; however, the present invention is not limited thereto and the blowing pressure may be applied after the clamping of the split mold in accordance with the mode of the pattern to be formed on the surface of the sheet. Alternatively, the sheet material P1 may be continuously sucked from the split mold 32A side through the first sealed space 84 while the sheet materials P1 and P2 are pressed through a second sealed space 86 formed inside by the pair of the split molds.

Moreover, in this example, the materials are shaped and molded directly as the resin-laminated board 100 utilizing the extruded molten sheet materials. However, the present invention is not limited thereto, and the materials may be extruded and molded once, the cooled thermoplastic resin sheet may be heated again and the material in the molten state may be used to perform the shaping and molding.

Further, in this example, when the front-side sheet 120A is disposed between the pair of split molds 32A and 32B, the sheet 120A is held above the split mold 32B and caused to fall along the cavity surface. However, the present invention is not limited thereto; in a state that the decorative material sheet 140 is disposed in the cavity 116B by the suction from the split mold 32B, for example, the split molds 32A and 32B may be clamped. Alternatively, the front-side sheet 120A to which the decorative material sheet 140 is attached in advance may be disposed.

The invention claimed is:

1. A method of manufacturing a resin-laminated board, comprising:
    preparing a pair of first and second split molds each of which is provided with a cavity;
    positioning two sheet materials made of a thermoplastic resin between the first and second split molds with the cavities of the first and second split molds opposed to each other;
    forming a plurality of recesses by recessing a first sheet material toward a second sheet material with use of a plurality of protrusions provided to the first split mold; and
    welding bottoms of the recesses to the second sheet material by clamping the pair of first and second split molds to obtain a resin-laminated board with a hollow structure,
    wherein a mold in use is configured to include a plurality of piece members: disposed at the cavity of the first split mold; and configured to include the protrusions and male screws provided to base ends of the protrusions, wherein the male screws are screwed into female screw holes provided to the first split mold,
wherein a sealed space is formed between the first sheet material and the cavity of the first split mold, and
wherein the first sheet member is shaped to follow the protrusions by vacuum suctioning the sealed space through a gap between the cavity of the first split mold and the base ends of the protrusions and through a gap between the female screw holes and the male screws.

* * * * *